(12) United States Patent
Oakes et al.

(10) Patent No.: US 11,430,974 B2
(45) Date of Patent: Aug. 30, 2022

(54) SYSTEM FOR ROLL-TO-ROLL ELECTROCOATING OF BATTERY ELECTRODE COATINGS ONTO A FOIL SUBSTRATE

(71) Applicant: PPG Industries Ohio, Inc., Cleveland, OH (US)

(72) Inventors: Landon J. Oakes, Cambridge, MA (US); Haley L. Orler, Bridgeville, PA (US); Stuart D. Hellring, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 656 days.

(21) Appl. No.: 16/415,061

(22) Filed: May 17, 2019

(65) Prior Publication Data

US 2020/0365873 A1 Nov. 19, 2020

(51) Int. Cl.
| | |
|---|---|
| *H01M 4/04* | (2006.01) |
| *C25D 13/16* | (2006.01) |
| *H01G 11/86* | (2013.01) |
| *H01G 11/28* | (2013.01) |
| *H01G 11/50* | (2013.01) |

(52) U.S. Cl.
CPC .......... *H01M 4/0457* (2013.01); *C25D 13/16* (2013.01); *H01G 11/28* (2013.01); *H01G 11/50* (2013.01); *H01G 11/86* (2013.01); *H01M 4/0435* (2013.01)

(58) Field of Classification Search
None
See application file for complete search history.

(56) References Cited

U.S. PATENT DOCUMENTS

| | | | |
|---|---|---|---|
| 3,459,651 | A | 8/1969 | Weininger et al. |
| 6,432,585 | B1 * | 8/2002 | Kawakami ............ H01M 4/244 429/233 |
| 6,917,147 | B2 | 7/2005 | Dijon et al. |
| 7,842,762 | B2 | 11/2010 | Zawacky et al. |
| 9,150,736 | B2 | 10/2015 | Daughenbaugh et al. |
| 9,660,252 | B2 | 5/2017 | Gaben et al. |
| 9,870,844 | B2 | 1/2018 | Daughenbaugh et al. |
| 2012/0288758 | A1 | 11/2012 | Hosoe et al. |
| 2014/0308576 | A1 | 10/2014 | Gaben et al. |

(Continued)

FOREIGN PATENT DOCUMENTS

| | | |
|---|---|---|
| CN | 105603494 A | 5/2016 |
| JP | 2000017485 | 1/2000 |

*Primary Examiner* — Christopher P Domone
(74) *Attorney, Agent, or Firm* — Charles M. Yeomans

(57) ABSTRACT

The present invention is directed toward a coating system for electrodepositing a battery electrode coating onto a foil substrate, the system comprising a tank structured and arranged to hold an electrodepositable coating composition; a feed roller positioned outside of the tank structured and arranged to feed the foil into the tank; at least one counter electrode positioned inside the tank, the counter electrode in electrical communication with the foil during operation of the system to thereby deposit the battery electrode coating onto the foil; and an in-line foil drier positioned outside the tank structured and arranged to receive the coated foil from the tank. Also disclosed are methods for electrocoating battery electrode coatings onto conductive foil substrates, coated foil substrates, and electrical storage devices comprising the coated foil substrates.

28 Claims, 1 Drawing Sheet

(56) References Cited

U.S. PATENT DOCUMENTS

2015/0333376 A1   11/2015  Gaben
2016/0380262 A1   12/2016  Grant et al.
2017/0022622 A1*   1/2017  Bao .................. C25D 13/22
2017/0222210 A1    8/2017  Xiao

* cited by examiner

SYSTEM FOR ROLL-TO-ROLL ELECTROCOATING OF BATTERY ELECTRODE COATINGS ONTO A FOIL SUBSTRATE

NOTICE OF GOVERNMENT SUPPORT

This invention was made with Government support under Government Contract No. DE-EE0007266 awarded by the Department of Energy. The United States Government has certain rights in this invention.

FIELD OF THE INVENTION

The present invention is directed towards systems and methods for electrocoating battery electrode coatings onto conductive foil substrates.

BACKGROUND INFORMATION

There is a trend in the electronics industry to produce smaller devices, powered by smaller and lighter batteries. Batteries with a negative electrode, such as a carbonaceous material, and a positive electrode, such as lithium metal oxides, can provide relatively high power and relatively low weight. Binders for producing such electrodes are usually combined with the negative electrode or positive electrode in the form of a solventborne or waterborne slurry that are applied to electrical current collectors to form an electrode. Once applied, the bound ingredients need to be able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move through the electrode, and lithium ion mobility requires interconnectivity within the electrode between active particles. However, solventborne slurries present safety, health and environmental dangers because many organic solvents utilized in these slurries are toxic and flammable, volatile in nature, carcinogenic, and involve special manufacturing controls to mitigate risk and reduce environmental pollution. In contrast, waterborne slurries have oftentimes produced unsatisfactory electrodes having poor adhesion and/or poor performance when included in an electrical storage device. Electrodeposition may overcome some of these deficiencies; however, the applied electrode films are susceptible to damage during processing. Novel coating systems are desired to improve electrode manufacturing and resulting electrode performance without the use of carcinogenic materials and environmental pollution.

SUMMARY OF THE INVENTION

Disclosed herein is a coating system for electrodepositing a battery electrode coating onto a foil substrate, the system comprising a tank structured and arranged to hold an electrodepositable coating composition; a feed roller positioned outside of the tank structured and arranged to feed the foil into the tank; at least one counter electrode positioned inside the tank, the counter electrode in electrical communication with the foil during operation of the system to thereby deposit the battery electrode coating onto the foil; and an in-line foil drier positioned outside the tank structured and arranged to receive the coated foil from the tank.

Also disclosed herein is a method for electrocoating a foil substrate using the coating system described above, the method comprising providing a foil substrate onto the feed roller; feeding the foil substrate into the tank past the counter electrode positioned inside the tank, wherein a surface of the foil substrate to be coated is submerged in the electrodepositable coating composition held in the tank; electrically coupling the counter electrode and the foil substrate to opposite poles of a power source; applying an electrical current from the power source to electrodeposit a coating from the electrodepositable coating composition onto the surface of the foil substrate; and then passing the coated foil substrate through the in-line foil drier to at least partially dry the coated foil substrate.

DETAILED DESCRIPTION OF THE INVENTION

Figure 1:
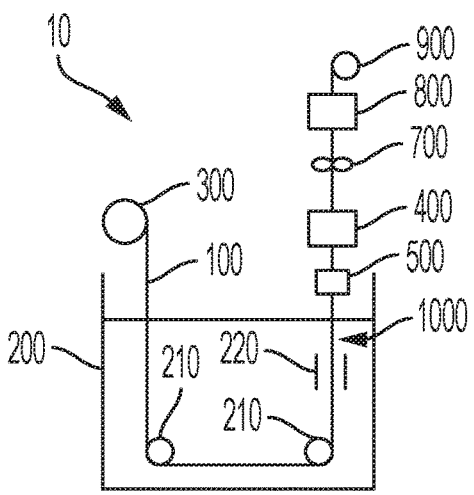
FIG. 1 is an illustration of a coating system of the present invention having a generally vertical alignment and two internal rollers located inside the tank.

As stated above, the present invention is directed to a coating system for electrodepositing a battery electrode coating onto a foil substrate. The present specification also discloses systems for coating a foil substrate, methods for coating foil substrates, foil substrates coated in accordance with one or more of the methods described herein, and/or through the use of one or more of the systems described herein.

Coating System

As shown for illustration purposes in FIGS. 1-4, the present invention is directed to a coating system 10 for electrodepositing a battery electrode coating onto a foil substrate 100, the system comprising a tank 200 structured and arranged to hold an electrodepositable coating composition 1000; a feed roller 300 positioned outside of the tank 200 structured and arranged to feed the foil 100 into the tank 200; at least one counter electrode 220 positioned inside the tank 200, the counter electrode 220 in electrical communication with the foil 100 during operation of the system 10 to thereby deposit the battery electrode coating onto the foil 100; and an in-line foil drier 400 positioned outside the tank 200 structured and arranged to receive the coated foil 100 from the tank 200. As used herein, the phrase "in electrical communication" refers to each of the counter electrode 220 and foil substrate 100 being at least partially submerged in the electrodepositable coating composition 1000 and positioned such that an electrical current can pass therebetween through the medium of the electrodepositable coating composition 1000.

According to the present invention, and as shown in FIGS. 1-4, the coating system 10 comprises a tank 200 structured and arranged to hold an electrodepositable coating composition 1000. For example, the tank 200 may comprise plastic, metal having an insulating liner such as metal having an internal plastic liner, or metal having an insulating coating. The tank 200 may comprise any geometric shape. For example, the tank 200 may be generally rectangular or generally round or spherical. The tank 200 may comprise a floor and at least one sidewall, such as four sidewalls as in case of the depicted exemplary rectangular configuration of FIGS. 1-4, extending up from the floor to form a cavity within which the electrodepositable coating composition 1000 may be held.

According to the present invention, and as shown in FIGS. 1-4, the coating system 10 comprises a feed roller 300 positioned outside of the tank 200 structured and arranged to feed the foil 100 into the tank 200. The feed roller 300 may be structured and arranged to hold a coil of the foil substrate 100, and the foil substrate 100 may be fed into the tank 200 by the feed roller 300 by unwinding the coil of the foil substrate 100.

According to the present invention, and as shown in FIGS. 1-4, the coating system 10 comprises at least one counter electrode 220 positioned inside the tank 200, the counter electrode 220 in electrical communication with the foil 100 during operation of the system 10 to thereby deposit the battery electrode coating onto the foil 100. The foil 100 is connected to one pole of a power source 1100 (not shown) and the counter-electrode 220 is connected to the opposite pole. An electrical current is impressed to the coating system 10 from the power source 1100 during operation of the coating system 10. The foil 100 is in electrical communication with and forms a circuit with the power source 1100 and the counter-electrode 220 resulting in the foil 100 and counter-electrode 200 maintaining opposite charges and attracting charged particles of the electrodepositable coating composition 1000 towards the foil 100 to deposit as a coating thereon when a sufficient electrical current is impressed to the coating system 10. The counter-electrode 220 generally runs along a length of the foil 100, and the coating system 10 may comprise at least two counter-electrodes with each structured and arranged to be present on opposite sides of the foil 100 such that an electrical current is maintained on both sides of the foil 100 such that an electrode coating is deposited on both sides of the foil 100 during operation of the coating system 10. The coating system 10 may comprise a plurality of such pairs of counter-electrodes 220 structured and arranged on opposite sides of the foil 100. The counter-electrode 220 may comprise any suitable conductive material, and the counter-electrode 220 may be membrane-free, or substantially membrane-free, or substantially covered by a membrane.

Figure 2:
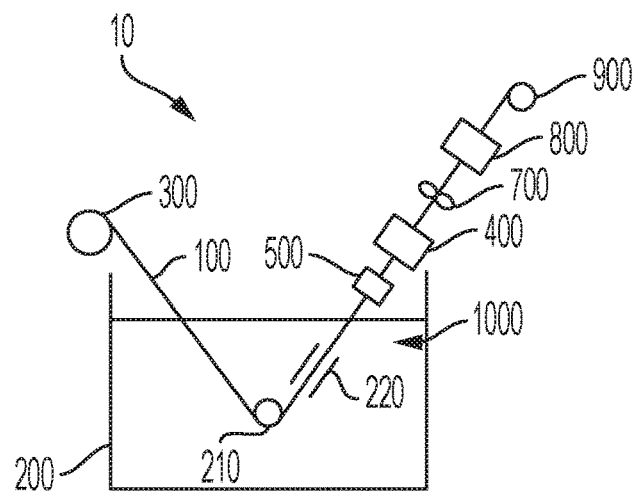
FIG. 2 is an illustration of a coating system of the present invention having a generally vertical alignment and one internal roller located inside the tank.
Figure 3:
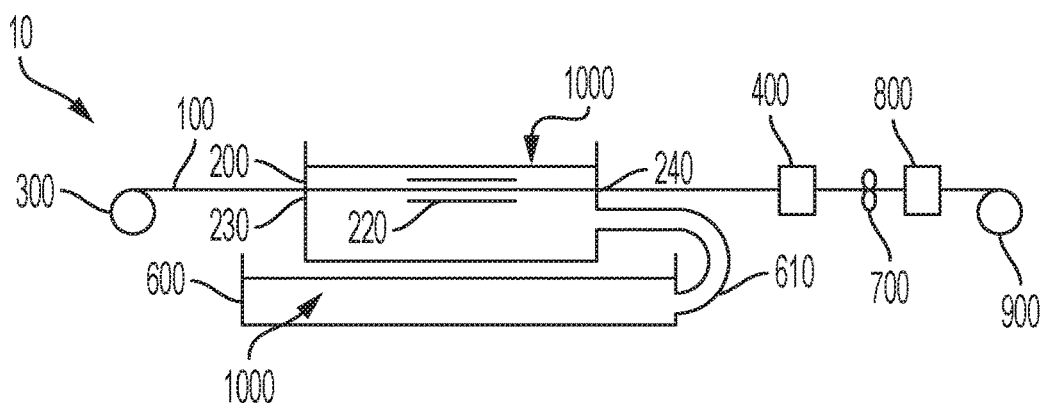
FIG. 3 is an illustration of a coating system of the present invention having a generally horizontal alignment and a foil entry aperture.
Figure 4:
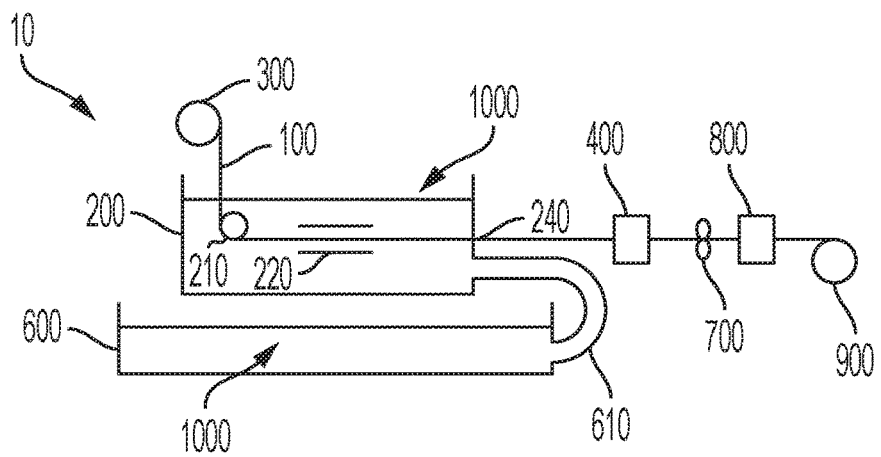
FIG. 4 is an illustration of a coating system of the present invention having a generally horizontal alignment and one internal roller located inside the tank.

According to the present invention, and as shown in FIGS. 1-4, the coating system 10 further comprises an in-line foil drier 400. The in-line foil drier 400 may comprise an in-line source of thermal energy, an in-line source of radiation, an in-line gas flow means, or a combination thereof. The in-line foil drier 400 may be positioned vertically above the tank 200 when the coating system 10 is in a vertical configuration, such as shown in FIGS. 1 and 2. Alternatively, the in-line foil drier 400 may be positioned horizontally next to the tank 200 when the coating system 10 is in a horizontal configuration, such as shown in FIGS. 3 and 4.

The in-line source of thermal energy or the in-line source of radiation may comprise an in-line oven, in-line lamps, or other sources of thermal energy and/or radiation. The in-line oven may comprise, for example, an in-line thermal oven (e.g., electric, gas, etc.), an in-line microwave oven, an in-line infrared oven, an in-line UV oven, or a combination thereof. An in-line oven may also optionally include a gas flow, such as, for example, a convection oven.

The in-line gas flow means may comprise a flow of gas directed to the surface of the coated foil substrate 100 that is capable of drying, i.e., removing at least a portion of the medium from the electrodepositable coating composition, the coating film on the surface of the foil substrate 100. For example, the in-line gas flow means may comprise blow driers, fans, gas compressors, or the like (including combinations thereof) and the in-line gas flow from the in-line gas flow means may comprise a nitrogen gas flow or an air flow. The gas flow may be directed in any suitable angle towards the surface of the coated foil substrate 100, for example, the gas flow may be perpendicular to the surface of the coated foil substrate 100 such that the gas flow is flush with the coated surface of the coated foil 100, or the gas flow may run perpendicular to the coated surface of the coated foil substrate 100 such that the gas flow flows over the coated surface of the coated foil substrate 100. The pressure upon which the in-line gas flow is directed towards the surface of the coated foil substrate 100 should be low enough that it does not cause damage to the coating film on the surface of the coated foil substrate 100. The in-line gas flow means may also comprise a source of thermal energy that heats the in-line gas flow such that the temperature of the in-line gas flow is warmer than ambient temperature.

The in-line foil drier 400 may also comprise a combination of an in-line source of thermal energy, an in-line source of radiation, and/or an in-line gas flow means, as mentioned above, which may comprise multiple sources or a single source. For example, the in-line foil drier 400 may comprise one or more lamps are a source of heat and/or radiation as well as an in-line gas flow means, or, alternatively or in addition to, a heated flow of air, such as from a blow drier, heated fans, or the like.

The in-line foil drier 400 at least partially dries the coating film on the surface of the coated foil substrate 100. The coating film on the surface of the coated foil substrate 100 will be considered to be at least partially dried when the coating film on the surface of the coated foil substrate 100 when the coating film is dry to the touch. The dryness of the coating film may be also be expressed relative to the total solids content of the coating film, for example, the coating film may have a solids content of about 40% by weight, based on the total weight of the coating film, when the film leaves the tank 200, such as 40% to 75%, such as 40% to 60%, such as 40% to 55%. The dryness of the coating film after it passes through the in-line foil drier 400 may be at least 75%, based on the total weight of the coating film, such as at least 80%, such as at least 85%, and may be from 75% to 99%, such as 80% to 95%, such as 80% to 90%, such as 85% to 95%, such as 85% to 90%.

The coating film on the surface of the coated foil substrate 100 may also display no observable sag of the coating film. For example, the coating film on the surface of the coated foil substrate 100 may display no observable sag over a period of 24 hours after electrodeposition.

The at least partial drying of the coating film on the surface of the coated foil substrate 100 enables further processing of the coated foil substrate 100 by the coating system 10 after it leaves the tank 200. If the coating film on the surface of the coated foil substrate 100 retains too much of the liquid medium of the electrodepositable coating composition 1000 after it leaves the tank 200, further processing of the coating film on the surface of the coated foil substrate 100 could result in damage to the coating film.

Such damage may be caused from contact with the coating film, such as, for example, from a roller. Accordingly, at least partially drying the coating film on the surface of the coated foil substrate 100 with the in-line foil drier 400 enables further processing of the coated foil substrate 100 sooner than if the coated foil substrate 100 was not at least partially dried. This enables the coating system 10 to process the foil substrate 100 more efficiently with a greater line speed than if the in-line foil drier 400 were not present. For example, if the coated foil substrate 100 was not sufficiently dried prior to being contacted with a roller, the coating film could delaminate off the foil substrate 100. The coating system 10 may be free of rollers located after the counter-electrode 220 and before the in-line foil drier 400.

The in-line foil drier 400 may also at least partially cure and/or fully cure the coating film on the surface of the coated foil substrate 100 if the in-line foil drier includes conditions that result in the crosslinking of components of the coating. As used herein, the term "cure" with respect to the applied coating film refers to chemical reactions of the components of the electrodepositable coating composition present in the film that form covalent bonds that crosslink the components of the composition together. Such curing may occur if the electrodepositable coating composition is a thermosetting or radiation-curable composition.

According to the present invention, and as shown in FIGS. 1-4, the coating system 10 may optionally further comprise a rinsing system 500. The rinsing system 500 may be positioned outside the tank and may provide a rinse of the coated foil substrate 100 after exiting the tank 200 and prior to entering the in-line foil drier 400. The rinsing system 500 rinse may remove any excess solid particles from the electrodepositable coating composition (i.e., a "cream coat" or "drag out") clinging to the surface of the coating film as it leaves the tank 200. The rinse of the rinsing system 500 may comprise a rinse-back that applies the rinse to the coating film above the tank 200 such that the rinse returns the solid particles back into the tank 200. The rinsing system 500 may comprise any combination of pipes, hoses, valves, and any other fluid conveying devices configured to perform the purposes stated herein.

According to the present invention, and as shown in FIGS. 1-4, the coating system 10 may optionally further comprise at least one internal roller 210 positioned inside the tank 200, the internal roller 210 structured and arranged to receive the foil substrate 100 from the feed roller 300 and direct the foil substrate 100 past the counter electrode 220. The internal roller 210 may comprise any suitable roller or material known in the art. The internal roller 210 is generally non-conductive or insulated from the coating system 10. FIG. 1 shows a vertical configuration of the coating system 10 wherein the tank 200 includes two internal rollers 210 that redirect the foil substrate 100 in the tank 200 to pass the counter-electrode 220 prior to leaving the tank 200. FIG. 2 shows an alternative vertical configuration of the coating system 10 wherein the tank 200 includes one internal roller 210 that redirects the foil substrate 100 in the tank 200 to pass the counter-electrode 220 prior to leaving the tank 200. FIG. 4 shows a horizontal configuration of the coating system 10 wherein the tank 200 includes one internal roller 210 that redirects the foil substrate 100 in the tank 200 to pass the counter-electrode 220 prior to leaving the tank 200. In contrast, FIG. 3 shows a horizontal configuration of the coating system 10 that does not include an internal roller 210.

According to the present invention, and as shown in FIGS. 3 and 4, the tank 200 of the coating system 10 may optionally further comprise a coated foil exit aperture 240 and the coated foil substrate 100 may exit the tank 200 through the coated foil exit aperture 240. As shown in FIGS. 3 and 4, the coated foil exit aperture 240 may be structured and arranged to be located below the fill level of the electrodepositable coating composition 1000 held by the tank 200. The coated foil exit aperture 240 must be large enough that the coated foil 100 may be able to fit through the coated foil exit aperture 240 without making contact with the sides of the coated foil aperture 240 that could damage the coating film. However, the size of the coating foil exit aperture 240 may also be relatively limited in size because the electrodepositable coating composition 1000 will also exit the tank 200 through the coating foil exit aperture 240.

According to the present invention, and as shown in FIGS. 3 and 4, when the tank 200 of the coating system 10 further comprises a coated foil exit aperture 240 the coating system 10 may further comprise a catch basin 600 located below the tank 200 structured and arranged to receive the electrodepositable coating composition 1000 exiting the tank 200 through the coated foil exit aperture 240. The coating system 10 may further comprise a recirculating conduit 610 for transferring the electrodepositable coating composition 1000 from the catch basin 600 into the tank 200. The return conduit 610 may comprise any combination of pipes, hoses, valves, and any other fluid conveying devices configured to perform the purposes stated herein.

According to the present invention, and as shown in FIG. 3, the tank 200 of the coating system 10 may optionally further comprise a foil substrate entry aperture 230 and the coated foil substrate 100 may enter the tank 200 through the foil substrate entry aperture 230. The foil substrate entry aperture 230 may be located below the fill level of the electrodepositable coating composition 1000 held by the tank 200, as shown in FIG. 3. The size and shape of the foil substrate entry aperture 230 may be similar to the coated foil exit aperture 240, however, the foil substrate entry aperture 230 may contact the foil substrate 100 and may comprise a duckbill valve, or the like, in order to reduce the amount of electrodepositable coating composition 1000 that may exit the tank 200 through the aperture. The catch basin 600 located below the tank 200 may also be structured and arranged to receive the electrodepositable coating composition 1000 exiting the tank 200 through the foil substrate entry aperture 230.

According to the present invention, and as shown in FIGS. 1-4, the coating system 10 may optionally further comprise compression rollers 700 that press the coated foil substrate 100 after it exits the in-line foil drier 400. The compression rollers 700 may comprise, for example, a pinch-roller calendar press that compresses the coating film on the coated foil substrate 100 to a desired porosity. As discussed above, the coating film must be a certain level of dryness before entering the compression rollers 700 in order to prevent damage to or delamination of the coating film from the foil substrate 100.

According to the present invention, and as shown in FIGS. 1-4, the coating system 10 may optionally further comprise an in-line finishing oven 800. The in-line finishing oven 800 provides further drying and/or curing of the coating film on the surface of the coated foil substrate 100. For example, the in-line finishing oven 800 may provide further drying and/or curing of the coated foil substrate 100 after it is pressed by the compression rollers 700. Alternatively, the in-line foil drier 400 itself may provide the all of the drying and/or curing of the coating film on the surface of the coated foil substrate 100.

The in-line finishing oven 800 may comprise any of the an in-line ovens, in-line lamps, or other sources of thermal energy and/or radiation discussed above with respect to the in-line foil drier, and may further comprise an in-line gas flow from the in-line gas flow means. The in-line finishing oven may receive the pressed coated foil 100 after it exits the compression rollers 700.

According to the present invention, and as shown in FIGS. 1-4, the coating system 10 may optionally further comprise at least one end roller 900 positioned outside the tank 200 for receiving the coated foil substrate 100 after it passes through the in-line foil drier 400 or in-line finishing oven 800, depending upon which component provides the final drying and/or curing of the coating film on the surface of the coated foil substrate 100. The end roller 900 may be structured and arranged to collect the foil substrate 100 as a coil.

As mentioned above, the coating film on the surface of the foil substrate 100 is electrodeposited onto the porous electrical current collector from an electrodepositable coating composition. As used herein, the term "electrodepositable coating composition" refers to a composition that is capable of being deposited onto an electrically conductive substrate under the influence of an applied electrical potential. The electrodepositable coating composition used to produce the coating of the electrode comprises an electrochemically active material and an electrodepositable binder, and the coating derived therefrom comprises the same.

The electrochemically active material may comprise a material for use as an active material for a positive electrode. For example, the electrochemically active material may comprise a material capable of incorporating lithium (including incorporation through lithium intercalation/deintercalation), a material capable of lithium conversion, or combinations thereof. Non-limiting examples of electrochemically active materials capable of incorporating lithium include $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, and combinations thereof. Non-limiting examples of materials capable of lithium conversion include $LiO_2$, $FeF_2$ and $FeF_3$, aluminum, $Fe_3O_4$, and combinations thereof.

The electrochemically active material may comprise a material for use as an active material for a negative electrode. For example, the electrochemically active material may comprise graphite, lithium titanate (LTO), lithium vanadium phosphate (LVP), silicon compounds, tin, tin compounds, sulfur, sulfur compounds, or a combination thereof.

The electrochemically active material may optionally comprise a protective coating. The protective coating may comprise, for example, metal compounds or complexes such as (i) a metal chalcogen, such as a metal oxide, metal sulfide, or metal sulfate; (ii) a metal pnictogen, such as a metal nitride; (iii) a metal halide, such as a metal fluoride; (iv) a metal oxyhalide, such as a metal oxyflouride; (v) a metal oxynitride; (vi) a metal phosphate; (vi) a metal carbide; (vii) a metal oxycarbide; (viii) a metal carbonitride; (ix) olivine(s); (x) NaSICON structure(s); (xi) polymetallic ionic structure(s); (xii) metal organic structure(s) or complex(es); (xiii) polymetallic organic structure(s) or complex(es); or (xiv) a carbon-based coating such as a metal carbonate. Metals that may be used to form the metal compounds or complexes include: alkali metals; transition metals; lanthanum; silicon; tin; germanium; gallium; aluminum; and indium. The metal may also be compounded with boron and/or carbon. The protective coating may comprise, for example, non-metal compounds or complexes such as (i) a non-metal oxide; (ii) a non-metal nitride; (iii) a non-metal carbonitride; (iv) a non-metal fluoride; (v) a non-metallic organic structures or complexes; (vi) or a non-metal oxyfluoride. For example, the protective coating may comprise titania, alumina, or lithium carbonate. Suitable thicknesses of the protective coating may be about 100 nm or less, such as about 0.1-50 nm, such as about 0.2-25 nm, such as about 0.5-20 nm, such as about 1-10 nm.

The electrochemically active material may be present in the electrodepositable coating composition in amount of 45% to 99% by weight, such as 70% to 98% by weight, such as 80% to 98% by weight, such as 90% to 98% by weight, such as 91% to 98% by weight, such as 91% to 95% by weight, such as 94% to 98% by weight, such as 95% to 98% by weight, such as 96% to 98% by weight, based on the total solids weight of the electrodepositable coating composition.

The electrodepositable coating composition further comprises an electrodepositable binder. The binder serves to bind together particles of the electrodepositable coating composition, such as the electrochemically active material and other optional materials, upon electrodeposition of the coating composition onto a substrate. As used herein, the term "electrodepositable binder" refers to binders that are capable of being deposited onto a conductive substrate by the process of electrodeposition. The electrodepositable binder may comprise a film-forming polymer and may optionally further comprise a curing agent that reacts with the film-forming polymer to cure to the electrodeposited coating composition, in addition to other optional components. The electrodepositable binder is not particularly limited so long as the electrodepositable binder is capable of being deposited onto a conductive substrate by the process of electrodeposition, and a suitable binder may be selected according to the type of electrical storage device of interest.

The film-forming resin of the electrodepositable binder may comprise an ionic film-forming resin. As used herein, the term "ionic film-forming resin" refers to any film-forming resin that carries a charge, including resins that carry a negatively charged (anionic) ion and resins that carry a positively charged (cationic) ion. Suitable ionic resins include, therefore, anionic resins and cationic resins. As will be understood by those skilled in the art, anionic resins are typically employed in anionic electrodepositable coating compositions where the substrate to be coated serves as the anode in the electrodeposition bath and cationic resins are typically employed in cationic electrodepositable coating compositions where the substrate to be coated serves as the cathode in the electrodeposition bath. As described in more detail below, the ionic resin may comprise salt groups comprising the ionic groups of the resin such that the anionic or cationic resins comprise anionic salt group-containing or cationic salt group-containing resins, respectively. Non-limiting examples of resins that are suitable for use as the ionic film-forming resin in the present invention include alkyd resins, acrylics, methacrylics, polyepoxides, polyamides, polyurethanes, polyureas, polyethers, and polyesters, among others.

The ionic film-forming resin may optionally comprise active hydrogen functional groups. As used herein, the term "active hydrogen functional groups" refers to those groups that are reactive with isocyanates as determined by the Zerewitinoff test described in the JOURNAL OF THE AMERICAN CHEMICAL SOCIETY, Vol. 49, page 3181 (1927), and include, for example, hydroxyl groups, primary or secondary amino groups, carboxylic acid groups, and thiol groups.

As discussed above, the ionic resin may comprise an anionic salt group-containing resin. Suitable anionic resins include resins comprise anionic groups, such as acid groups, such as carboxylic acid groups or phosphorous acid groups, which impart a negative charge that may be at least partially neutralized with a base to form the anionic salt group-containing resin. An anionic salt group-containing resin that comprises active hydrogen functional groups may be referred to as an active hydrogen-containing, anionic salt group-containing resin.

The electrodepositable binder may comprise an ionic cellulose derivative, such as an anionic cellulose derivative. Non-limiting examples of anionic cellulose derivatives includes carboxymethylcellulose and salts thereof (CMC). CMC is a cellulosic ether in which a portion of the hydroxyl groups on the anhydroglucose rings are substituted with carboxymethyl groups. Non-limiting examples of anionic cellulose derivatives include those described in U.S. Pat. No. 9,150,736, at col. 4, line 20 through col. 5, line 3, the cited portion of which is incorporated herein by reference.

Examples of (meth)acrylic polymers are those which are prepared by polymerizing mixtures of (meth)acrylic monomers. The anionic (meth)acrylic polymer may comprise carboxylic acid moieties that are introduced into the polymer from the use of (meth)acrylic carboxylic acids. Non-limiting examples of suitable anionic (meth)acrylic polymers include those described in U.S. Pat. No. 9,870,844, at col. 3, line 37 through col. 6, line 67, the cited portion of which is incorporated herein by reference.

Non-limiting examples of other anionic resins that are suitable for use in the compositions described herein include those described in U.S. Pat. No. 9,150,736, at col. 5, lines 4-41, the cited portion of which is incorporated herein by reference.

As mentioned above, in adapting an anionic resin to be solubilized or dispersed in an aqueous medium, it is often at least partially neutralized with a base. Suitable bases include both organic and inorganic bases. Non-limiting examples of suitable bases include ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholine, e.g., N-methylmorpholine or N-ethylmorpholine. Non-limiting examples of suitable inorganic bases include the hydroxide, carbonate, bicarbonate, and acetate bases of alkali or alkaline metals, specific examples of which include potassium hydroxide, lithium hydroxide, and sodium hydroxide. The resin(s) may be at least partially neutralized from 20 to 200 percent, such as 40 to 150 percent, such as 60 to 120 percent of theoretical neutralization, based upon the total number of anionic groups present in the resin.

As discussed above, the ionic resin may comprise a cationic salt group-containing resin. Suitable cationic salt-group containing resins include resins that contain cationic groups, such as sulfonium groups and cationic amine groups, which impart a positive charge that may be at least partially neutralized with an acid to form the cationic salt group-containing resin. A cationic salt group-containing resin that comprises active hydrogen functional groups may be referred to as an active hydrogen-containing, cationic salt group-containing resin.

Non-limiting examples of cationic resins that are suitable for use in the compositions described herein include those described in U.S. Pat. No. 9,150,736, at col. 6, line 29 through col. 8, line 21, the cited portion of which is incorporated herein by reference.

As will be appreciated, in adapting the cationic resin to be solubilized or dispersed in an aqueous medium, the resin may be at least partially neutralized by, for example, treating with an acid. Non-limiting examples of suitable acids are inorganic acids, such as phosphoric acid and sulfamic acid, as well as organic acids, such as, acetic acid and lactic acid, among others. Besides acids, salts such as dimethylhydroxyethylammonium dihydrogenphosphate and ammonium dihydrogenphosphate can be used. The cationic resin may be neutralized to the extent of at least 50% or, in some cases, at least 70%, of the total theoretical neutralization equivalent of the cationic polymer based on the total number of cationic groups. The step of solubilization or dispersion may be accomplished by combining the neutralized or partially neutralized resin with the aqueous medium.

The electrodepositable binder may optionally comprise a pH-dependent rheology modifier. The pH-dependent rheology modifier may comprise a portion of or all of the film-forming polymer and/or binder. As used herein, the term "pH-dependent rheology modifier" refers to an organic compound, such as a molecule, oligomer or polymer, that has a variable rheological effect based upon the pH of the composition. The pH-dependent rheology modifier may affect the viscosity of the composition on the principle of significant volume changes of the pH-dependent rheology modifier induced by changes in the pH of the composition. For example, the pH-dependent rheology modifier may be soluble at a pH range and provide certain rheological properties and may be insoluble and coalesce at a critical pH value (and above or below based upon the type of pH-dependent rheology modifier) which causes a reduction in the viscosity of the composition due to a reduction in the volume of the rheology modifier. The relationship between the pH of the composition and viscosity due to the presence of the pH-dependent rheology modifier may be non-linear. The pH-dependent rheology modifier may comprise an alkali-swellable rheology modifier or an acid swellable rheology modifier, depending upon the type of electrodeposition that the electrodepositable coating composition is to be employed. For example, alkali-swellable rheology modifiers may be used for anionic electrodeposition, whereas acid swellable rheology modifiers may be used for cathodic electrodeposition.

The use of the pH-dependent rheology modifier in the binder of the electrodepositable coating composition in the amounts herein may allow for the production of electrodes by electrodeposition. The pH-dependent rheology modifier may comprise ionic groups and/or ionic salt groups, but such groups are not required. Without intending to be bound by any theory, it is believed that the pH dependence of the rheology modifier assists in the electrodeposition of the electrodepositable coating composition because the significant difference in pH of the electrodeposition bath at the surface of the substrate to be coated relative to the remainder of the electrodeposition bath causes the pH-dependent rheology modifier to undergo a significant reduction in volume at, or in close proximity to, the surface of the substrate to be coated inducing coalescence of the pH-dependent rheology modifier, along with the other components of the electrodepositable coating composition, on the surface of the substrate to be coated. For example, the pH at the surface of the anode in anodic electrodeposition is significantly reduced relative to the remainder of the electrodeposition bath. Likewise, the pH at the surface cathode in cathodic electrodeposition is significantly higher than the rest of the electrodeposition bath. The difference in pH at the surface of the electrode to be coated during electrodeposition relative to the electrodeposition bath in a static state may be at least 6 units, such as at least 7 units, such as at least 8 units.

As used herein, the term "alkali-swellable rheology modifier" refers to a rheology modifier that increases the viscosity of a composition (i.e., thickens the composition) as the pH of the composition increases. The alkali-swellable rheology modifier may increase viscosity at a pH of about 2.5 or greater, such as about 3 or greater, such as about 3.5 or greater, such as about 4 or greater, such as about 4.5 or greater, such as about 5 or greater.

Non-limiting examples of alkali-swellable rheology modifiers include alkali-swellable emulsions (ASE), hydrophobically modified alkali-swellable emulsions (HASE), star polymers, and other materials that provide pH-triggered rheological changes at low pH, such as the pH values described herein. The alkali-swellable rheology modifiers may comprise addition polymers having constitutional units comprising the residue of ethylenically unsaturated monomers. For example, the alkali-swellable rheology modifiers may comprise addition polymers having constitutional units comprising, consisting essentially of, or consisting of the residue of: (a) 2 to 70% by weight of a monoethylenically unsaturated carboxylic acid, such as 20 to 70% by weight, such as 25 to 55% by weight, such as 35 to 55% by weight, such as 40 to 50% by weight, such as 45 to 50% by weight; (b) 20 to 80% by weight of a $C_1$ to $C_6$ alkyl (meth)acrylate, such as 35 to 65% by weight, such as 40 to 60% by weight, such as 40 to 50% by weight, such as 45 to 50% by weight; and at least one of (c) 0 to 3% by weight of a crosslinking monomer, such as 0.1 to 3% by weight, such as 0.1 to 2% by weight; and/or (d) 0 to 60% by weight of a monoethylenically unsaturated alkyl alkoxylate monomer, such as 0.5 to 60% by weight, such as 10 to 50% by weight, the % by weight being based on the total weight of the addition polymer. The ASE rheology modifiers may comprise (a) and (b) and may optionally further comprise (c), and the HASE rheology modifiers may comprise (a), (b) and (d), and may optionally further comprise (c). When (c) is present, the pH-dependent rheology modifier may be referred to as a crosslinked pH-dependent rheology modifier. When the acid groups have a high degree of protonation (i.e., are un-neutralized) at low pH, the rheology modifier is insoluble in water and does not thicken the composition, whereas when the acid is substantially deprotonated (i.e., substantially neutralized) at higher pH values, the rheology modifier becomes soluble or dispersible (such as micelles or microgels) and thickens the composition.

The (a) monoethylenically unsaturated carboxylic acid may comprise a $C_3$ to $C_8$ monoethylenically unsaturated carboxylic acid such as acrylic acid, methacrylic acid, and the like, as well as combinations thereof.

The (b) $C_1$ to $C_8$ alkyl (meth)acrylate may comprise a $C_1$ to $C_6$ alkyl (meth)acrylate, such as a $C_1$ to $C_4$ alkyl (meth)acrylate. The $C_1$ to $C_8$ alkyl (meth)acrylate may comprise a non-substituted $C_1$ to $C_8$ alkyl (meth)acrylate such as, for example, methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isopentyl (meth)acrylate, hexyl (meth)acrylate, heptyl (meth)acrylate, isoheptyl (meth)acrylate, 2-ethylhexyl (meth)acrylate, or combinations thereof.

The (c) crosslinking monomer may comprise a polyethylenically unsaturated monomer such as ethylene glycol di(meth)acrylate, 1,6-hexanediol di(meth)acrylate, divinylbenzene, trimethylolpropane diallyl ether, tetraallyl pentaerythritol, triallyl pentaerythritol, diallyl pentaerythritol, diallyl phthalate, triallyl cyanurate, bisphenol A diallyl ether, methylene bisacrylamide, allyl sucroses, and the like, as well as combinations thereof.

The (d) monoethylenically unsaturated alkylated ethoxylate monomer may comprise a monomer having a polymerizable group, a hydrophobic group and a bivalent polyether group of a poly(alkylene oxide) chain, such as a poly(ethylene oxide) chain having about 5-150 ethylene oxide units, such as 6-10 ethylene oxide units, and optionally 0-5 propylene oxide units. The hydrophobic group is typically an alkyl group having 6-22 carbon atoms (such as a dodecyl group) or an alkaryl group having 8-22 carbon atoms (such as octyl phenol). The bivalent polyether group typically links the hydrophobic group to the polymerizable group. Examples of the bivalent polyether group linking group and hydrophobic group are a bicycloheptyl-polyether group, a bicycloheptenyl-polyether group or a branched $C_5$-$C_{50}$ alkyl-polyether group, wherein the bicycloheptyl-polyether or bicycloheptenyl-polyether group may optionally be substituted on one or more ring carbon atoms by one or two $C_1$-$C_6$ alkyl groups per carbon atom.

In addition to the monomers described above, the pH-dependent rheology modifier may comprise other ethylenically unsaturated monomers. Examples thereof include substituted alkyl (meth)acrylate monomers substituted with functional groups such as hydroxyl, amino, amide, glycidyl, thiol, and other functional groups; alkyl (meth)acrylate monomers containing fluorine; aromatic vinyl monomers; and the like. Alternatively, the pH-dependent rheology modifier may be substantially free, essentially free, or completely free of such monomers. As used herein, a pH-dependent rheology modifier is substantially free or essentially free of a monomer when constitutional units of that monomer are present, if at all, in an amount of less than 0.1% by weight or less than 0.01% by weight, respectively, based on the total weight of the pH-dependent rheology modifier.

The pH-dependent rheology modifier may be substantially free, essentially free, or completely free of amide, glycidyl or hydroxyl functional groups. As used herein, a pH-dependent rheology modifier if substantially free or essentially free of amide, glycidyl or hydroxyl functional groups if such groups are present, if at all, in an amount of less than 1% or less than 0.1% based on the total number of functional groups present in the pH-dependent rheology modifier.

The pH-dependent rheology modifier may comprise, consist essentially of, or consist of constitutional units of the residue of methacrylic acid, ethyl acrylate and a crosslinking monomer, present in the amounts described above.

The pH-dependent rheology modifier may comprise, consist essentially of, or consist of constitutional units of the residue of methacrylic acid, ethyl acrylate and a monoethylenically unsaturated alkyl alkoxylate monomer, present in the amounts described above.

The pH-dependent rheology modifier may comprise, consist essentially of, or consist of methacrylic acid, ethyl acrylate, a crosslinking monomer and a monoethylenically unsaturated alkyl alkoxylate monomer, present in the amounts described above.

Commercially available pH-dependent rheology modifiers include alkali-swellable emulsions such as ACRYSOL ASE-60, hydrophobically modified alkali-swellable emulsions such as ACRYSOL HASE TT-615, and ACRYSOL DR-180 HASE, each of which are available from the Dow Chemical Company, and star polymers, including those produced by atom transfer radical polymerization, such as fracASSIST® prototype 2 from ATRP Solutions.

Exemplary viscosity data showing the impact of the alkali-swellable rheology modifier across a range of pH values of a composition was obtained for some non-limiting examples of alkali-swellable rheology modifiers using a Brookfield viscometer operated at 20 RPMs and using a #4 spindle. The alkali-swellable rheology modifiers ACRYSOL ASE-60, ACRYSOL HASE TT-615, and ACRYSOL DR-180 HASE were characterized at 4.25% solids in a solution of deionized water. A star polymer (fracASSIST® prototype 2) was investigated at 0.81% solids due to the limited solubility of the polymer at low pH. The pH was adjusted through the addition of dimethyl ethanolamine ("DMEA"). The viscosity measurements in centipoise (cps) across the range of pH values is provided below in Table 1.

TABLE 1

| Rheology Modifier Property | ACRYSOL ASE-60 | | ACRYSOL HASE-TT-615 | | fracASSIST ® prototype 2 | | ACRYSOL DR-180 HASE | |
|---|---|---|---|---|---|---|---|---|
| | pH | Viscosity | pH | Viscosity | pH | Viscosity | pH | Viscosity |
| | 3.53 | 0 | 4.24 | 0 | 4.04 | 0 | 4.30 | 0 |
| | 6.31 | 2,010 | 5.90 | 454 | 6.09 | 2,274 | 6.10 | 90 |
| | 6.43 | 19,280 | 6.40 | 15,600 | 7.23 | 2,352 | 6.20 | 11,160 |
| | 6.77 | 19,130 | 7.04 | Off-scale | 7.68 | 1,914 | 7.13 | Off-scale |
| | 7.42 | 17,760 | — | — | 8.72 | 1,590 | — | — |

As shown in Table 1, a composition of water and an alkali-swellable rheology modifier at 4.25% by weight of the total composition may have an increase in viscosity of at least 500 cps over an increase in pH value of 3 pH units within the pH range of 3 to 12, such as an increase of at least 1,000 cps, such as an increase of at least 2,000 cps, such as an increase of at least 3,000 cps, such as an increase of at least 5,000 cps, such as an increase of at least 7,000 cps, such as an increase of at least 8,000 cps, such as an increase of at least 9,000 cps, such as an increase of at least 10,000 cps, such as an increase of at least 12,000 cps, such as an increase of at least 14,000 cps, or more. For example, as shown for the ACRYSOL ASE-60 alkali-swellable rheology modifier in Table 1, an increase in pH from about 3.5 to about 6.5 results in an increase in the viscosity of the composition of about 19,000 cps. A composition of water and an alkali-swellable rheology modifier at 4.25% by weight of the total composition may result in a corresponding decrease in the viscosity of the composition over a corresponding decrease in pH value.

As shown in Table 1, a 4.25% by weight solution of the alkali-swellable rheology modifier, the % by weight based on the total weight of the solution, may have a viscosity increase of at least 1,000 cps when measured from about pH 4 to about pH 7, such as at least 1,500 cps, such as at least 1,900 cps, such as at least 5,000 cps, such as at least 10,000 cps, such as at least 15,000 cps, such as at least 17,000 cps, as measured using a Brookfield viscometer using a #4 spindle and operated at 20 RPMs. A composition of water and an alkali-swellable rheology modifier at 4.25% by weight of the total composition may result in a corresponding decrease in the viscosity of the composition over a corresponding decrease in pH value.

As shown in Table 1, a 4.25% by weight solution of the alkali-swellable rheology modifier, the % by weight based on the total weight of the solution, may have a viscosity increase of at least 1,000 cps when measured from about pH 4 to about pH 6.5, such as at least 1,500 cps, such as at least 1,900 cps, such as at least 5,000 cps, such as at least 10,000 cps, such as at least 15,000 cps, such as at least 17,000 cps, as measured using a Brookfield viscometer using a #4 spindle and operated at 20 RPMs. A composition of water and an alkali-swellable rheology modifier at 4.25% by weight of the total composition may result in a corresponding decrease in the viscosity of the composition over a corresponding decrease in pH value.

As shown in Table 1, a composition of water and an alkali-swellable rheology modifier of an star polymer at 0.81% by weight of the total composition may have a viscosity increase of at least 400 cps when measured from about pH 4 to about pH 6.5, such as at least 600 cps, such as at least 800 cps, such as at least 1,000 cps, such as at least 1,200 cps, such as at least 1,400 cps, such as at least 2,000 cps, such as at least 2,200 cps, as measured using a Brookfield viscometer using a #4 spindle and operated at 20 RPMs.

As used herein, the term "star polymer" refers to branched polymers with a general structure consisting of several (three or more) linear chains connected to a central core. The core of the polymer can be an atom, molecule, or macromolecule; the chains, or "arms", may include variable-length organic chains. Star-shaped polymers in which the arms are all equivalent in length and structure are considered homogeneous, and ones with variable lengths and structures are considered heterogeneous. The star polymer may comprise any functional groups that enable the star polymer to provide pH-dependent rheology modification.

As used herein, the term "acid-swellable rheology modifier" refers to a rheology modifier that is insoluble at high pH and does not thicken the composition and is soluble at lower pH and thickens the composition. The acid-swellable rheology modifier may increase viscosity at a pH of about 4 or less, such as about 4.5 or less, such as about 5 or less, such as about 6 or less.

The pH-dependent rheology modifier may be present in the electrodepositable binder of the electrodepositable coating composition in an amount of 10% to 100% by weight, such as 20% to 100% by weight, such as 30% to 100% by weight, 40% to 100% by weight, 50% to 100% by weight, 60% to 100% by weight, 70% to 100% by weight, 75% to 100% by weight, 80% to 100% by weight, 85% to 100% by weight, 90% to 100% by weight, 93% to 100% by weight, 95% to 100% by weight, such as 50% to 99% by weight, such as 75% to 95% by weight, such as 87% to 93% by weight, 10% to 50% by weight, such as 10% to 30% by weight, such as 10% to 20% by weight, based on the total solids weight of the binder solids.

The pH-dependent rheology modifier may be present in the electrodepositable coating composition in an amount of 0.1% to 10% by weight, such as 0.2% to 10% by weight, such as 0.3% to 10% by weight, such as 1% to 7% by weight, such as 1.5% to 5% by weight, such as 2% to 4.5% by weight, such as 3% to 4% by weight, such as 0.1% to 0.4% by weight, such as 0.1% to 1% by weight, based on the total solids weight of the electrodepositable coating composition.

According to the present invention, the electrodepositable binder may optionally further comprise a fluoropolymer. The fluoropolymer may comprise a portion of the electrodepositable binder of the electrodepositable coating composition. The fluoropolymer may be present in the electrodepositable coating composition in the form of micelles.

The fluoropolymer may comprise a (co)polymer comprising the residue of vinylidene fluoride. A non-limiting example of a (co)polymer comprising the residue of vinylidene fluoride is a polyvinylidene fluoride polymer (PVDF). As used herein, the "polyvinylidene fluoride polymer" includes homopolymers, copolymers, such as binary copolymers, and terpolymers, including high molecular weight homopolymers, copolymers, and terpolymers. Such (co)polymers include those containing at least 50 mole percent, such as at least 75 mole %, and at least 80 mole %, and at least 85 mole % of the residue of vinylidene fluoride (also known as vinylidene difluoride). The vinylidene fluoride monomer may be copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride in order to produce the fluoropolymer of the present invention. The fluoropolymer may also comprise a PVDF homopolymer.

The fluoropolymer may comprise a high molecular weight PVDF having a weight average molecular weight of at least 50,000 g/mol, such as at least 100,000 g/mol, and may range from 50,000 g/mol to 1,500,000 g/mol, such as 100,000 g/mol to 1,000,000 g/mol. PVDF is commercially available, e.g., from Arkema under the trademark KYNAR, from Solvay under the trademark HYLAR, and from Inner Mongolia 3F Wanhao Fluorochemical Co., Ltd.

The fluoropolymer may comprise a (co)polymer comprising the residue of tetrafluoroethylene. The fluoropolymer may also comprise a polytetrafluoroethylene (PTFE) homopolymer.

The fluoropolymer may comprise a nanoparticle. As used herein, the term "nanoparticle" refers to particles having a particle size of less than 1,000 nm. The fluoropolymer nanoparticles may have a particle size of 50 nm to 999 nm, such as 100 nm to 800 nm, such as 100 nm to 600 nm, such as 250 nm to 450 nm, such as 300 nm to 400 nm, such as 100 nm to 400 nm, such as 100 nm to 300 nm, such as 100 nm to 200 nm. Although the fluoropolymer may comprise a nanoparticle, larger particles and combinations of nanoparticles and larger particles may also be used. As used herein, the term "particle size" refers to average diameter of the fluoropolymer particles. The particle size referred to in the present disclosure was determined by the following procedure: A sample was prepared by dispersing the fluoropolymer onto a segment of carbon tape that was attached to an aluminum scanning electron microscope (SEM) stub. Excess particles were blown off the carbon tape with compressed air. The sample was then sputter coated with Au/Pd for 20 seconds and was then analyzed in a Quanta 250 FEG SEM (field emission gun scanning electron microscope) under high vacuum. The accelerating voltage was set to 20.00 kV and the spot size was set to 3.0. Images were collected from three different areas on the prepared sample, and ImageJ software was used to measure the diameter of 10 fluoropolymer particles from each area for a total of 30 particle size measurements that were averaged together to determine the average particle size.

The fluoropolymer may be present in in the electrodepositable binder in amounts of, for example, 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight, such as 55% to 65% by weight, based on the total weight of the binder solids.

The fluoropolymer may be present in the electrodepositable coating composition in an amount of, for example, 0.1% to 10% by weight, such as 1% to 6% by weight, such as 1.3% to 4.5% by weight, such as 1.9% to 2.9% by weight, based on the total solids weight of the electrodepositable coating composition.

The fluoropolymer to pH-dependent rheology modifier weight ratio may be, for example, from 1:20 to 20:1, such as 1:2 to 15:1, such as 1:1 to 10:1, such as 3:1 to 6:1.

Alternatively, the electrodepositable coating composition may be substantially free, essentially free, or completely free of fluoropolymer. As used herein, the electrodepositable coating composition is substantially free or essentially free of fluoropolymer when fluoropolymer is present, if at all, in an amount of less than 5% by weight or less than 0.2% by weight, respectively, based on the total weight of the binder solids.

The electrodepositable binder may optionally further comprise a dispersant. The dispersant may assist in dispersing the fluoropolymer, the electrochemically active material, and/or, as described further below, the electrically conductive agent (if present) in the aqueous medium. The dispersant may comprise at least one phase that is compatible with the fluoropolymer and/or other components of the electrodepositable coating composition, such as the electrochemically active material or, if present, the electrically conductive agent and may further comprise at least one phase that is compatible with the aqueous medium. The electrodepositable coating composition may comprise one, two, three, four or more different dispersants, and each dispersant may assist in dispersing a different component of the electrodepositable coating composition. The dispersant may comprise any material having phases compatible with both a component of the solids (e.g., the electrodepositable binder, such as the fluoropolymer (if present), the electrochemically active material, and/or the electrically conductive agent) and the aqueous medium. As used herein, the term "compatible" means the ability of a material to form a blend with other materials that is and will remain substantially homogenous over time. For example, the dispersant may comprise a polymer comprising such phases. The dispersant and the fluoropolymer, if present, may not be bound by a covalent bond. The dispersant may be present in the electrodepositable coating composition in the form of a micelle. The dispersant may be in the form of a block polymer, a random polymer, or a gradient polymer, wherein the different phases of the dispersant are present in the different blocks of the polymer, are randomly included throughout the polymer, or are progressively more or less densely present along the polymer backbone, respectively. The dispersant may comprise any suitable polymer to serve this purpose. For example, the polymer may comprise addition polymers produced by polymerizing ethylenically unsaturated monomers, polyepoxide polymers, polyamide polymers, polyurethane polymers, polyurea polymers, polyether polymers, polyacid polymers, and/or polyester polymers, among others. The dispersant may also serve as an additional component of the binder of the electrodepositable coating composition.

The dispersant may comprise functional groups. The functional groups may comprise, for example, active hydrogen functional groups, heterocyclic groups, and combinations thereof. As used herein, the term "heterocyclic group" refers to a cyclic group containing at least two different elements in its ring such as a cyclic moiety having at least one atom in addition to carbon in the ring structure, such as, for example, oxygen, nitrogen or sulfur. Non-limiting examples of heterocylic groups include epoxides, lactams and lactones. In addition, when epoxide functional groups are present on the addition polymer, the epoxide functional groups on the dispersant may be post-reacted with a beta-hydroxy functional acid. Non-limiting examples of beta-hydroxy functional acids include citric acid, tartaric acid, and/or an aromatic acid, such as 3-hydroxy-2-naphthoic acid. The ring opening reaction of the epoxide functional group will yield hydroxyl functional groups on the dispersant.

When acid functional groups are present, the dispersant may have a theoretical acid equivalent weight of 350 to 17,570 g/acid equivalent, such as 878 to 12,000 g/acid equivalent, such as 1,757 to 7,000 g/acid equivalent.

As mentioned above, the dispersant may comprise an addition polymer. The addition polymer may be derived from, and comprise constitutional units comprising the residue of, one or more alpha, beta-ethylenically unsaturated monomers, such as those discussed below, and may be prepared by polymerizing a reaction mixture of such monomers. The mixture of monomers may comprise one or more active hydrogen group-containing ethylenically unsaturated monomers. The reaction mixture may also comprise ethylenically unsaturated monomers comprising a heterocyclic group. As used herein, an ethylenically unsaturated monomer comprising a heterocyclic group refers to a monomer having at least one alpha, beta ethylenic unsaturated group and at least cyclic moiety having at least one atom in addition to carbon in the ring structure, such as, for example, oxygen, nitrogen or sulfur. Non-limiting examples of ethylenically unsaturated monomers comprising a heterocyclic group include epoxy functional ethylenically unsaturated monomers, vinyl pyrrolidone and vinyl caprolactam, among others. The reaction mixture may additionally comprise other ethylenically unsaturated monomers such as alkyl esters of (meth)acrylic acid and others described below.

The addition polymer may comprise a (meth)acrylic polymer that comprises constitutional units comprising the residue of one or more (meth)acrylic monomers. The (meth)acrylic polymer may be prepared by polymerizing a reaction mixture of alpha, beta-ethylenically unsaturated monomers that comprise one or more (meth)acrylic monomers and optionally other ethylenically unsaturated monomers. As used herein, the term "(meth)acrylic monomer" refers to acrylic acid, methacrylic acid, and monomers derived therefrom, including alkyl esters of acrylic acid and methacrylic acid, and the like. As used herein, the term "(meth)acrylic polymer" refers to a polymer derived from or comprising constitutional units comprising the residue of one or more (meth)acrylic monomers. The mixture of monomers may comprise one or more active hydrogen group-containing (meth)acrylic monomers, ethylenically unsaturated monomers comprising a heterocyclic group, and other ethylenically unsaturated monomers. The (meth)acrylic polymer may also be prepared with an epoxy functional ethylenically unsaturated monomer such as glycidyl methacrylate in the reaction mixture, and epoxy functional groups on the resulting polymer may be post-reacted with a beta-hydroxy functional acid such as citric acid, tartaric acid, and/or 3-hydroxy-2-naphthoic acid to yield hydroxyl functional groups on the (meth)acrylic polymer.

The addition polymer may comprise constitutional units comprising the residue of an alpha, beta-ethylenically unsaturated carboxylic acid. Non-limiting examples of alpha, beta-ethylenically unsaturated carboxylic acids include those containing up to 10 carbon atoms such as acrylic acid and methacrylic acid. Non-limiting examples of other unsaturated acids are alpha, beta-ethylenically unsaturated dicarboxylic acids such as maleic acid or its anhydride, fumaric acid and itaconic acid. Also, the half esters of these dicarboxylic acids may be employed. The constitutional units comprising the residue of the alpha, beta-ethylenically unsaturated carboxylic acids may comprise 1% to 50% by weight, 2% to 50% by weight, such as 2% to 20% by weight, such as 2% to 15% by weight, such as 2% to 10% by weight, such as 2% to 5% by weight, such as 1% to 5% by weight, based on the total weight of the addition polymer. The addition polymer may be derived from a reaction mixture comprising the alpha, beta-ethylenically unsaturated carboxylic acids in an amount of 1% to 50% by weight, 2% to 50% by weight, such as 2% to 20% by weight, such as 2% to 10% by weight, such as 2% to 5% by weight, such as 1% to 5% by weight, based on the total weight of polymerizable monomers used in the reaction mixture. The inclusion of constitutional units comprising the residue of an alpha, beta-ethylenically unsaturated carboxylic acids in the dispersant results in a dispersant comprising at least one carboxylic acid group which may assist in providing stability to the dispersion.

The addition polymer may comprise constitutional units comprising the residue of an alkyl esters of (meth)acrylic acid containing from 1 to 3 carbon atoms in the alkyl group. Non-limiting examples of alkyl esters of (meth)acrylic acid containing from 1 to 3 carbon atoms in the alkyl group include methyl (meth)acrylate and ethyl (meth)acrylate. The constitutional units comprising the residue of the alkyl esters of (meth)acrylic acid containing from 1 to 3 carbon atoms in the alkyl group may comprise 20% to 98% by weight, such as 30% to 96% by weight, such as 30% to 90% by weight, 40% to 90% by weight, such as 40% to 80% by weight, such as 45% to 75% by weight, based on the total weight of the addition polymer. The addition polymer may be derived from a reaction mixture comprising the alkyl esters of (meth)acrylic acid containing from 1 to 3 carbon atoms in the alkyl group in an amount of 20% to 98% by weight, such as 30% to 96% by weight, such as 30% to 90% by weight, 40% to 90% by weight, such as 40% to 80% by weight, such as 45% to 75% by weight, based on the total weight of polymerizable monomers used in the reaction mixture.

The addition polymer may comprise constitutional units comprising the residue of an alkyl esters of (meth)acrylic acid containing from 4 to 18 carbon atoms in the alkyl group. Non-limiting examples of alkyl esters of (meth)acrylic acid containing from 4 to 18 carbon atoms in the alkyl group include butyl (meth)acrylate, hexyl (meth)acrylate, octyl (meth)acrylate, isodecyl (meth)acrylate, stearyl (meth)acrylate, 2-ethylhexyl (meth)acrylate, decyl (meth)acrylate and dodecyl (meth)acrylate. The constitutional units comprising the residue of the alkyl esters of (meth)acrylic acid containing from 4 to 18 carbon atoms in the alkyl group may comprise 2% to 70% by weight, such as 2% to 60% by weight, such as 5% to 50% by weight, 10% to 40% by weight, such as 15% to 35% by weight, based on the total weight of the addition polymer. The addition polymer may be derived from a reaction mixture comprising the alkyl esters of (meth)acrylic acid containing from 4 to 18 carbon atoms in the alkyl group in an amount of 2% to 70% by weight, such as 2% to 60% by weight, such as 5% to 50% by weight, 10% to 40% by weight, such as 15% to 35% by weight, based on the total weight of polymerizable monomers used in the reaction mixture.

The addition polymer may comprise constitutional units comprising the residue of a hydroxyalkyl ester. Non-limiting examples of hydroxyalkyl esters include hydroxyethyl (meth)acrylate and hydroxypropyl (meth)acrylate. The constitutional units comprising the residue of the hydroxyalkyl ester may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the hydroxyalkyl ester in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture. The inclusion of constitutional units comprising the residue of a hydroxyalkyl ester in the dispersant results in a dispersant comprising at least one hydroxyl group (although hydroxyl groups may be included by other methods). Hydroxyl groups resulting from inclusion of the hydroxyalkyl esters (or incorporated by other means) may react with a separately added crosslinking agent that comprises functional groups reactive with hydroxyl groups such as, for example, an aminoplast, phenolplast, polyepoxides and blocked polyisocyanates, or with N-alkoxymethyl amide groups or blocked isocyanato groups present in the addition polymer when self-crosslinking monomers that have groups that are reactive with the hydroxyl groups are incorporated into the addition polymer.

The addition polymer may comprise constitutional units comprising the residue of an ethylenically unsaturated monomer comprising a heterocyclic group. Non-limiting examples of ethylenically unsaturated monomers comprising a heterocyclic group include epoxy functional ethylenically unsaturated monomers, such as glycidyl (meth)acrylate, vinyl pyrrolidone and vinyl caprolactam, among others. The constitutional units comprising the residue of the ethylenically unsaturated monomers comprising a heterocyclic group may comprise 0.5% to 99% by weight, such as 0.5% to 50% by weight, such as 1% to 40% by weight, such as 5% to 30% by weight, 8% to 27% by weight, based on the total weight of the addition polymer. The addition polymer may be derived from a reaction mixture comprising the ethylenically unsaturated monomers comprising a heterocyclic group in an amount of 0.5% to 50% by weight, such as 1% to 40% by weight, such as 5% to 30% by weight, 8% to 27% by weight, based on the total weight of polymerizable monomers used in the reaction mixture.

As noted above, the addition polymer may comprise constitutional units comprising the residue of a self-crosslinking monomer, and the addition polymer may comprise a self-crosslinking addition polymer. As used herein, the term "self-crosslinking monomer" refers to monomers that incorporate functional groups that may react with other functional groups present on the dispersant to form a crosslink between the dispersant or more than one dispersant. Non-limiting examples of self-crosslinking monomers include N-alkoxymethyl (meth)acrylamide monomers such as N-butoxymethyl (meth)acrylamide and N-isopropoxymethyl (meth)acrylamide, as well as self-crosslinking monomers containing blocked isocyanate groups, such as isocyanatoethyl (meth)acrylate in which the isocyanato group is reacted ("blocked") with a compound that unblocks at curing temperature. Examples of suitable blocking agents include epsilon-caprolactone and methylethyl ketoxime. The constitutional units comprising the residue of the self-crosslinking monomer may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the self-crosslinking monomer in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture.

The addition polymer may comprise constitutional units comprising the residue of other alpha, beta-ethylenically unsaturated monomers. Non-limiting examples of other alpha, beta-ethylenically unsaturated monomers include vinyl aromatic compounds such as styrene, alpha-methyl styrene, alpha-chlorostyrene and vinyl toluene; organic nitriles such as acrylonitrile and methacrylonitrile; allyl monomers such as allyl chloride and allyl cyanide; monomeric dienes such as 1,3-butadiene and 2-methyl-1,3-butadiene; and acetoacetoxyalkyl (meth)acrylates such as acetoacetoxyethyl methacrylate (AAEM) (which may be self-crosslinking). The constitutional units comprising the residue of the other alpha, beta-ethylenically unsaturated monomers may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the other alpha, beta-ethylenically unsaturated monomers in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture.

The monomers and relative amounts may be selected such that the resulting addition polymer has a Tg of 100° C. or less, typically from −50° C. to +70° C., such as −50° C. to 0° C. A lower Tg that is below 0° C. may be desirable to ensure acceptable battery performance at low temperature.

The addition polymers may be prepared by conventional free radical initiated solution polymerization techniques in which the polymerizable monomers are dissolved in a solvent or a mixture of solvents and polymerized in the presence of a free radical initiator until conversion is complete. The solvent used to produce the addition polymer may comprise any suitable organic solvent or mixture of solvents.

Examples of free radical initiators are those which are soluble in the mixture of monomers such as azobisisobutyronitrile, azobis(alpha, gamma-methylvaleronitrile), tertiary-butyl perbenzoate, tertiary-butyl peracetate, benzoyl peroxide, ditertiary-butyl peroxide and tertiary amyl peroxy 2-ethylhexyl carbonate.

Optionally, a chain transfer agent which is soluble in the mixture of monomers such as alkyl mercaptans, for example, tertiary-dodecyl mercaptan; ketones such as methyl ethyl ketone, chlorohydrocarbons such as chloroform can be used. A chain transfer agent provides control over the molecular weight to give products having required viscosity for various coating applications.

To prepare the addition polymer, the solvent may be first heated to reflux and the mixture of polymerizable monomers containing the free radical initiator may be added slowly to the refluxing solvent. The reaction mixture is then held at polymerizing temperatures so as to reduce the free monomer content, such as to below 1.0 percent and usually below 0.5 percent, based on the total weight of the mixture of polymerizable monomers.

For use in the electrodepositable coating composition of the invention, the dispersants prepared as described above usually have a weight average molecular weight of about 5,000 to 500,000 g/mol, such as 10,000 to 100,000 g/mol, and 25,000 to 50,000 g/mol.

The dispersant may be present in the electrodepositable binder of the electrodepositable coating composition in amount of 2% to 35% by weight, such as 5% to 32% by weight, such as 8% to 30% by weight, such as 15% to 27% by weight, based on the total weight of the binder solids.

The electrodepositable binder may optionally comprise a non-fluorinated organic film-forming polymer. The non-fluorinated organic film-forming polymer is different than the pH-dependent rheology modifier described herein. The non-fluorinated organic film-forming polymer may comprise polysaccharides, poly(meth)acrylates, polyethylene, polystyrene, polyvinyl alcohol, poly (methyl acrylate), poly (vinyl acetate), polyacrylonitrile, polyimide, polyurethane, polyvinyl butyral, polyvinyl pyrrolidone, styrene butadiene rubber, nitrile rubber, xanthan gum, copolymers thereof, or combinations thereof. Each of these organic film-forming polymers may be ionic and comprise an ionic film-forming resin.

The non-fluorinated organic film-forming polymer may be present, if at all, in an amount of 0% to 90% by weight, such as 20% to 60% by weight, such as 25% to 40% by weight, based on the total weight of the binder solids.

The non-fluorinated organic film-forming polymer may be present, if at all, in an amount of at least 0% to 9.9% by weight, such as 0.1% to 5% by weight, such as 0.2% to 2% by weight, such as 0.3% to 0.5% by weight, based on the total solids weight of the electrodepositable coating composition.

The electrodepositable coating composition may also be substantially free, essentially free, or completely free of any one or all of the non-fluorinated organic film-forming polymer described herein.

As mentioned above, the binder may optionally further comprise a crosslinking agent. The crosslinking agent should be soluble or dispersible in the aqueous medium and be reactive with active hydrogen groups of the pH-dependent rheology modifier (if the pH-dependent rheology modifier comprises such groups) and/or any other resinous film-forming polymers comprising active hydrogen groups present (if present) in the composition. Non-limiting examples of suitable crosslinking agents include aminoplast resins, blocked polyisocyanates, carbodiimides, and polyepoxides.

Examples of aminoplast resins for use as a crosslinking agent are those which are formed by reacting a triazine such as melamine or benzoguanamine with formaldehyde. These reaction products contain reactive N-methylol groups. Usually, these reactive groups are etherified with methanol, ethanol, or butanol including mixtures thereof to moderate their reactivity. For the chemistry preparation and use of aminoplast resins, see "The Chemistry and Applications of Amino Cros slinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Blocked polyisocyanate crosslinking agents are typically diisocyanates such as toluene diisocyanate, 1,6-hexamethylene diisocyanate and isophorone diisocyanate including isocyanato dimers and trimers thereof in which the isocyanate groups are reacted ("blocked") with a material such as epsilon-caprolactam and methylethyl ketoxime. At curing temperatures, the blocking agents unblock exposing isocyanate functionality that is reactive with the hydroxyl functionality associated with the (meth)acrylic polymer. Blocked polyisocyanate crosslinking agents are commercially available from Covestro as DESMODUR BL.

Carbodiimide crosslinking agents may be in monomeric or polymeric form, or a mixture thereof. Carbodiimide crosslinking agents refer to compounds having the following structure:

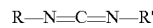

wherein R and R' may each individually comprise an aliphatic, aromatic, alkylaromatic, carboxylic, or heterocyclic group. Examples of commercially available carbodiimide crosslinking agents include, for example, those sold under the trade name CARBODILITE available from Nisshinbo Chemical Inc., such as CARBODILITE V-02-L2, CARBODILITE SV-02, CARBODILITE E-02, CARBODILITE SW-12G, CARBODILITE V-10 and CARBODILITE E-05.

Examples of polyepoxide crosslinking agents are epoxy-containing (meth)acrylic polymers such as those prepared from glycidyl methacrylate copolymerized with other vinyl monomers, polyglycidyl ethers of polyhydric phenols such as the diglycidyl ether of bisphenol A; and cycloaliphatic polyepoxides such as 3,4-epoxycyclohexylmethyl-3,4-epoxycyclohexane carboxylate and bis(3,4-epoxy-6-methylcyclohexyl-methyl) adipate.

The crosslinking agent may be present in the electrodepositable coating composition in amounts of 0% to 30% by weight, such as 5% to 20% by weight, such as 5% to 15% by weight, such as 7% to 12% by weight, the % by weight being based on the total weight of the binder solids.

The crosslinking agent may be present in the electrodepositable coating composition in amounts of 0% to 2% by weight, such as 0.1% to 1% by weight, such as 0.2% to 0.8% by weight, such as 0.3% to 0.5% by weight, the % by weight being based on the total solids weight of the electrodepositable coating composition.

Alternatively, the electrodepositable coating composition may be substantially free, essentially free or completely free of crosslinking agent. The electrodepositable coating composition is substantially free or essentially free of crosslinking agent if crosslinking agent is present, if at all, in an amount of less than 3% or less than 1%, respectively, based on the total weight of the binder solids.

The electrodepositable coating composition may optionally further comprise an adhesion promoter. The adhesion promoter may comprise an acid-functional polyolefin or a thermoplastic material.

The acid-functional polyolefin adhesion promoter may comprise an ethylene-(meth)acrylic acid copolymer, such as an ethylene-acrylic acid copolymer or an ethylene-methacrylic acid copolymer. The ethylene-acrylic acid copolymer may comprise constitutional units comprising 10% to 50% by weight acrylic acid, such as 15% to 30% by weight, such as 17% to 25% by weight, such as about 20% by weight, based on the total weight of the ethylene-acrylic acid copolymer, and 50% to 90% by weight ethylene, such as 70% to 85% by weight, such as 75% to 83% by weight, such as about 80% by weight, based on the total weight of the ethylene-acrylic acid copolymer. A commercially available example of such an addition polymer includes PRIMACOR 5980i, available from the Dow Chemical Company.

The adhesion promoter may be present in the electrodepositable coating composition in an amount of 1% to 60% by weight, such as 10% to 40% by weight, such as 25% to 35% by weight, based on the total weight of the binder solids (including the adhesion promoter).

Alternatively, the electrodepositable coating composition may be substantially free, essentially free or completely free of adhesion promoter. The electrodepositable coating composition is substantially free or essentially free of adhesion promoter if adhesion promoter is present, if at all, in an amount of less than 1% or less than 0.1%, respectively, based on the total weight of the binder solids.

The electrodepositable coating composition may optionally comprise a catalyst to catalyze the reaction between the curing agent and the active hydrogen-containing resin(s). Suitable catalysts include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate). The catalyst may also comprise an organic compound such as a guanidine. For example, the guanidine may comprise a cyclic guanidine as described in U.S. Pat. No. 7,842,762 at col. 1, line 53 to col. 4, line 18 and col. 16, line 62 to col. 19, line 8, the cited portions of which being incorporated herein by reference. If present, the catalyst may be present in an amount of 0.01% to 5% by weight, such as 0.1% to 2% by weight, based on the total weight of the binder solids.

Alternatively, the electrodepositable coating composition may be substantially free, essentially free, or completely free of catalyst. The electrodepositable coating composition is substantially free or essentially free of catalyst if catalyst is present, if at all, in an amount of less than 0.01% or less than 0.001%, respectively, based on the total weight of the binder solids.

As used herein, the term "binder solids" may be used synonymously with "resin solids" and includes any film-forming polymer, such as those described above, and, if present, the curing agent. For example, the binder solids include, if present, the pH-dependent rheology modifier, the fluoropolymer, the dispersant, the adhesion promoter, the non-fluorinated organic film-forming polymer, catalyst, and the separately added crosslinking agent, as described above. The binder solids do not include the electrochemically active material and electrically conductive agent, if present. As used herein, the term "binder dispersion" refers to a dispersion of the binder solids in the aqueous medium.

The electrodepositable binder may comprise, consist essentially of, or consist of the ionic, film-forming resin in an amount of 10% to 100% by weight, such as 50% to 95% by weight, such as 70% to 93% by weight, such as 87% to 92% by weight; and the crosslinking agent, if present, in amounts of 0 to 30% by weight, such as 5% to 15% by weight, such as 8% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the fluoropolymer in an amount of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the fluoropolymer in an amount of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight; the dispersant in an amount of 2% to 35% by weight, such as 5% to 32% by weight, such as 8% to 30% by weight, such as 15% to 27% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the fluoropolymer in an amount of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight; the dispersant in an amount of 2% to 35% by weight, such as 5% to 32% by weight, such as 8% to 30% by weight, such as 15% to 27% by weight; the adhesion promoter in an amount of 1% to 60% by weight, such as 10% to 40% by weight, such as 25% to 35% by weight; the non-fluorinated organic film-forming polymer, if present, in an amount of 0% to 90% by weight, such as 20% to 60% by weight, such as 25% to 40% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the adhesion promoter, if present, in an amount of 1% to 60% by weight, such as 10% to 40% by weight, such as 25% to 35% by weight; the non-fluorinated organic film-forming polymer, if present, in an amount of 0% to 90% by weight, such as 20% to 60% by weight, such as 25% to 40% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may be present in the electrodepositable coating composition in amounts of 0.1% to 20% by weight, such as 0.2% to 10% by weight, such as 0.3% to 8% percent by weight, such as 0.5% to 5% by weight, such as 1% to 3% by weight, such as 1.5% to 2.5% by weight, such as 1% to 2% by weight, based on the total solids weight of the electrodepositable coating composition.

The electrodepositable coating composition of the present invention may optionally further comprise an electrically conductive agent when the electrochemically active material comprises a material for use as an active material for a positive electrode. Non-limiting examples of electrically conductive agents include carbonaceous materials such as, activated carbon, carbon black such as acetylene black and furnace black, graphite, graphene, carbon nanotubes, carbon fibers, fullerene, and combinations thereof. It should be noted graphite may be used as both an electrochemically active material for negative electrodes as well as an electrically conductive agent, but an electrically conductive material is typically omitted when graphite is used as the electrochemically active material.

In addition to the material described above, the electrically conductive agent may comprise an active carbon having a high-surface area, such as, for example, a BET surface area of greater than 100 m$^2$/g. As used herein, the term "BET surface area" refers to a specific surface area determined by nitrogen adsorption according to the ASTM D 3663-78 standard based on the Brunauer-Emmett-Teller method described in the periodical "The Journal of the American Chemical Society", 60, 309 (1938). In some examples, the conductive carbon can have a BET surface area of 100 m$^2$/g to 1,000 m$^2$/g, such as 150 m$^2$/g to 600 m$^2$/g, such as 100 m$^2$/g to 400 m$^2$/g, such as 200 m$^2$/g to 400 m$^2$/g. In some examples, the conductive carbon can have a BET surface area of about 200 m$^2$/g. A suitable conductive carbon material is LITX 200 commercially available from Cabot Corporation.

The electrically conductive agent may be present in the electrodepositable coating composition in amounts of 0.5% to 20% by weight, such as 1% to 20% by weight, such as 2% to 10% by weight, such as 2.5% to 7% by weight, such as 3% to 5% by weight, based on the total solids weight of the electrodepositable coating composition.

According to the present invention, the electrodepositable coating composition further comprises an aqueous medium comprising water. As used herein, the term "aqueous medium" refers to a liquid medium comprising more than 50% by weight water, based on the total weight of the aqueous medium. Water may comprise 50.1% to 100% by weight, such as 70% to 100% by weight, such as 80% to 100% by weight, such as 85% to 100% by weight, such as 90% to 100% by weight, such as 95% to 100% by weight, such as 99% to 100% by weight, such as 99.9% to 100% by weight, based on the total weight of the aqueous medium. The aqueous medium may further comprise one or more organic solvent(s). Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. Such aqueous mediums may comprise less than 50% by weight organic solvent, or less than 40% by weight organic solvent, or less than 30% by weight organic solvent, or less than 20% by weight organic solvent, or less than 10% by weight organic solvent, or less than 5% by weight organic solvent, or less than 1% by weight organic solvent, less than 0.8% by weight organic solvent, or less than 0.1% by weight organic solvent, based on the total weight of the aqueous medium. The electrodepositable coating composition may in particular be provided in the form of a dispersion, such as an aqueous dispersion.

Organic solvent may be added to a waterborne formulation to modify viscosity within a desired range. The organic solvent added to the electrodepositable coating composition, or other waterborne formulation, may induce polymer swelling to achieve viscosity modification. The use of pH-dependent rheology modifiers described herein may allow for a reduction in the total amount of organic solvent required to meet desired viscosity targets to reduce the environmental impact of the compositions. Accordingly, use of the pH-dependent rheology modifier as described above in an electrodepositable coating composition may allow for production of electrodepositable coating compositions having a lower volatile organic content (VOC) than previously produced waterborne formulations. As used herein, the term "volatile organic content" or "VOC" refers to organic compounds having a boiling point of less than 250° C. As used herein, the term "boiling point" refers to the boiling point of a substance at standard atmospheric pressure of 101.325 kPa (1.01325 bar or 1 atm), also referred to as the normal boiling point. The volatile organic content includes volatile organic solvents. As used herein, the term "volatile organic solvent" refers to organic compounds having a boiling point of less than 250° C., such as less than 200° C. For example, the VOC of the electrodepositable coating composition of the present invention may be no more than 500 g/L, such as no more than 300 g/L, such as no more than 150 g/L, such as no more than 50 g/L, such as no more than 1 g/L, such as 0 g/L, and may range from 0 to 500 g/L, such as 0.1 to 300 g/L, such as 0.1 to 150 g/L, such as 0.1 to 50 g/L, such as 0.1 to 1 g/L. The VOC may be calculated according to the following formula:

$$VOC(g/L) = \frac{\text{total weight of } VOC \text{ (g)}}{\text{volume of total composition (L)} - \text{volume of water (L)}}$$

The organic solvent may be present, if at all, in an amount of less than 30% by weight, such as less than 20% by weight, such as less than 10% by weight, such as less than 5% by weight, such as less than 3% by weight, such as less than 1% by weight, such as less than 0.5% by weight, such as less than 0.3% by weight, such as less than 0.1% by weight, such as 0.0% by weight, based on the total weight of the electrodepositable coating composition.

Water may be present in the aqueous medium such that the total amount of water present in the electrodepositable coating composition may be from 40% to 99% by weight, such as 45% to 99% by weight, such as 50% to 99% by weight, such as 60% to 99% by weight, such as 65% to 99% by weight, such as 70% to 99% by weight, such as 75% to 99% by weight, such as 80% to 99% by weight, such as 85% to 99% by weight, such as 90% to 99% by weight, such as 40% to 90% by weight, such as 45% to 85% by weight, such as 50% to 80% by weight, such as 60% to 75% by weight, based on the total weight of the electrodepositable coating composition.

The total solids content of the electrodepositable coating composition may be at least 0.1% by weight, such as at least 1% by weight, such as at least 3% by weight, such as at least 5% by weight, such as at least 7% by weight, such as at least 10% by weight, such as at least at least 20% by weight, such as at least 30% by weight, such as at least 40% by weight, based on the total weight of the electrodepositable coating composition. The total solids content may be no more than 60% by weight, such as no more than 50% by weight, such as no more than 40% by weight, such as no more than 30% by weight, such as no more than 25% by weight, such as no more than 20% by weight, such as no more than 15% by weight, such as no more than 12% by weight, such as no more than 10% by weight, such as no more than 7% by weight, such as no more than 5% by weight, based on the total weight of the electrodepositable coating composition. The total solids content of the electrodepositable coating composition may be 0.1% to 60% by weight, such as 0.1% to 50% by weight, such as 0.1% to 40% by weight, such as 0.1% to 30% by weight, such as 0.1% to 25% by weight, such as 0.1% to 20% by weight, such as 0.1% to 15% by weight, such as 0.1% to 12% by weight, such as 0.1% to 10% by weight, such as 0.1% to 7% by weight, such as 0.1% to 5% by weight, such as 0.1% to 1% by weight, such as 1% to 60% by weight, such as 1% to 50% by weight, such as 1% to 40% by weight, such as 1% to 30% by weight, such as 1% to 25% by weight, such as 1% to 20% by weight, such as 1% to 15% by weight, such as 1% to 12% by weight, such as 1% to 10% by weight, such as 1% to 7% by weight, such as 1% to 5% by weight based on the total weight of the electrodepositable coating composition.

The electrodepositable coating composition may be packaged in the form of a concentrate that is diluted with water and optionally organic solvent prior to use as an electrodepositable coating composition. Upon dilution, the electrodepositable coating composition should have a solids and water content as described herein.

The electrodepositable coating composition may optionally further comprise a pH adjustment agent. The pH adjustment agent may comprise an acid or base. The acid may comprise, for example, phosphoric acid or carbonic acid. The base may comprise, for example, lithium hydroxide, lithium carbonate, or dimethylethanolamine (DMEA). Any suitable amount of pH adjustment agent needed to adjust the pH of the electrodepositable coating composition to the desired pH range may be used.

The electrodepositable coating composition may be substantially free, essentially free, or completely free of N-methyl-2-pyrrolidone (NMP). The electrodepositable coating composition may also be substantially free, essentially free, or completely free of further fugitive adhesion promoter. As used herein, the term "fugitive adhesion promoter" refers to N-methyl-2-pyrrolidone (NMP), dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea. As used herein, an electrodepositable coating composition substantially free of fugitive adhesion promoter includes less than 1% by weight fugitive adhesion promoter, if any at all, based on the total weight of the electrodepositable coating composition. As used herein, an electrodepositable coating composition essentially free of fugitive adhesion promoter includes less than 0.1% by weight fugitive adhesion promoter, if any at all, based on the total weight of the electrodepositable coating composition. When present, the fugitive adhesion promoter may be present in an amount of less than 2% by weight, such as less 1% by weight, such as less than 0.9% by weight, such as less than 0.1% by weight, such as less than 0.01% by weight, such as less than 0.001% by weight, based on the total weight of the electrodepositable coating composition.

According to the present invention, the electrodepositable coating composition may be substantially free, essentially free or completely free of fluoropolymer.

The electrodepositable coating composition may be substantially free, essentially free, or completely free of organic carbonate. As used herein, an electrodepositable composition is substantially free or essentially free of organic carbonate when organic carbonate is present, if at all, in an amount less than 1% by weight or less than 0.1% by weight, respectively, based on the total weight of the electrodepositable coating composition.

The electrodepositable coating composition may be substantially free, essentially free, or completely free of acrylic-modified fluoropolymer. As used herein, an electrodepositable composition is substantially free or essentially free of acrylic-modified fluoropolymer when acrylic-modified fluoropolymer is present, if at all, in an amount less than 1% by weight or less than 0.1% by weight, respectively, based on the total weight of the electrodepositable coating composition.

According to the present invention, the electrodepositable coating composition may be substantially free, essentially free or completely free of polyethylene, polytetrafluoroethylene, tetrafluoroethylene-hexafluoropropylene copolymer, and/or polyacrylonitrile derivatives.

The electrodepositable coating may be substantially free, essentially free, or completely free of isophorone.

The electrodepositable coating composition may be substantially free, essentially free, or completely free of organic carbonate. As used herein, an electrodepositable composition is substantially free or essentially free of organic carbonate when organic carbonate is present, if at all, in an amount less than 1% by weight or less than 0.1% by weight, respectively, based on the total weight of the electrodepositable coating composition.

The electrodepositable coating composition may be substantially free of acrylonitrile. As used herein, an electrodepositable composition is substantially free or essentially free of acrylonitrile when acrylonitrile is present, if at all, in an amount less than 1% by weight or less than 0.1% by weight, respectively, based on the total weight of the electrodepositable coating composition.

The electrodepositable coating composition may be substantially free of graphene oxide. As used herein, an electrodepositable composition is substantially free or essentially free of graphene oxide when graphene oxide is present, if at all, in an amount less than 5% by weight or less than 1% by weight, respectively, based on the total weight of the electrodepositable coating composition.

The pH-dependent rheology modifier may be substantially free, essentially free, or completely free of the residue of a carboxylic acid amide monomer unit. As used herein, a pH-dependent rheology modifier is substantially free or essentially free of carboxylic acid amide monomer units when carboxylic acid amide monomer units are present, if at all, in an amount less than 0.1% by weight or less than 0.01% by weight, respectively, based on the total weight of the pH-dependent rheology modifier.

The electrodepositable coating may be substantially free of isophorone. As used herein, an electrodepositable composition is substantially free or essentially free of isophorone when isophorone is present, if at all, in an amount less than 5% by weight or less than 1% by weight, respectively, based on the total weight of the electrodepositable coating composition.

The electrodepositable coating may be substantially free, essentially free, or completely free of isophorone.

The electrodepositable coating may be substantially free, essentially free, or completely free of a cellulose derivative. Non-limiting examples of cellulose derivatives includes carboxymethylcellulose and salts thereof (CMC). CMC is a cellulosic ether in which a portion of the hydroxyl groups on the anhydroglucose rings are substituted with carboxymethyl groups.

The electrodepositable coating may be substantially free, essentially free, or completely free of multi-functional hydrazide compounds. As used herein, an electrodepositable composition is substantially free or essentially free of multi-functional hydrazide compounds when multi-functional hydrazide compounds are present, if at all, in an amount less than 0.1% by weight or less than 0.01% by weight, respectively, based on the total binder solids weight of the electrodepositable coating composition.

The electrodepositable coating may be substantially free, essentially free, or completely free of styrene-butadiene rubber (SBR), acrylonitrile butadiene rubber or acrylic rubber. As used herein, an electrodepositable composition is substantially free or essentially free of styrene-butadiene rubber (SBR), acrylonitrile butadiene rubber or acrylic rubber when styrene-butadiene rubber (SBR), acrylonitrile butadiene rubber or acrylic rubber is present, if at all, in an amount less than 5% by weight or less than 1% by weight, respectively, based on the total binder solids weight of the electrodepositable coating composition.

The electrodepositable coating may be substantially free, essentially free, or completely free of poly(meth)acrylic acid having more than 70% by weight (meth)acrylic acid functional monomers, based on the total weight of the poly (meth)acrylic acid. As used herein, an electrodepositable composition is substantially free or essentially free of poly (meth)acrylic acid when poly(meth)acrylic acid is present, if at all, in an amount less than 5% by weight or less than 1% by weight, respectively, based on the total binder solids weight of the electrodepositable coating composition.

The electrodepositable coating composition may be substantially free, essentially free, or completely free of particulate polymers containing the residue of an aliphatic conjugated diene monomer unit and an aromatic vinyl monomer unit. As used herein, an electrodepositable composition is substantially free or essentially free of such particular polymers when the particular polymer is present, if at all, in an amount less than 5% by weight or less than 1% by weight, respectively, based on the total weight of the binder solids.

Method for Electrocoating a Foil Substrate

The present invention is also directed to a method for electrocoating a foil substrate using the coating system described above, the method comprising providing a foil substrate 100 onto the feed roller 300; feeding the foil substrate 100 into the tank 200 past the counter electrode 220 positioned inside the tank 200, wherein a surface of the foil substrate 100 to be coated is submerged in the electrodepositable coating composition 1000 held in the tank 200; electrically coupling the counter electrode 200 and the foil substrate 100 to opposite poles of a power source 1100; applying an electrical current from the power source 1100 to electrodeposit a coating from the electrodepositable coating composition 1000 onto the surface of the foil substrate 100; and then passing the coated foil substrate 100 through the in-line foil drier 400 to at least partially dry the coated foil substrate 100.

The method may optionally further comprise passing the foil substrate 100 between compression rollers 700 after the foil substrate 100 is passed through the in-line foil drier 400, and compressing the coated foil substrate 100 by the compression rollers 700 after the foil substrate 100 is at least partially dried in the in-line foil drier 400.

The method may optionally further comprise passing the foil substrate 100 through an in-line finishing oven 800 after the foil substrate 100 is passed through the compression rollers 700, and heating the coated foil substrate 100 in the in-line finishing oven 800 after the foil substrate 100 is compressed by the compression rollers 700.

The method may optionally further comprise rolling the coated foil substrate 100 onto an end roller 900 after the coated foil substrate 100 leaves the in-line foil drier 400 or in-line finishing oven 800.

The foil substrate may be continuously fed through the coating system 10 according to the method of the present invention. For example, the foil substrate 100 may be continuously fed through the coating system 10 from the feed roller 300 and be continuously collected as a coated foil substrate 100 on the end roller 900.

During electrodeposition, an electric current is passed between the electrodes to cause the non-liquid components of the electrodepositable coating composition 1000 to migrate towards the foil substrate 100 and deposit as a continuous film on the surface thereof. The applied voltage may be varied and can be, for example, as low as one volt to as high as several thousand volts, but is often between 50 and 500 volts. The current density is often between 0.5 ampere and 15 amperes per square foot. The residence time of the applied electrical potential to the substrate in the composition may be from 10 to 180 seconds.

The method further comprises drying and/or curing the deposited coating on surface of the foil substrate 100 after it is removed from the bath. For example, after the foil substrate 100 exits the tank 200, the foil substrate enters the in-line foil drier 400 and may optionally further enter the in-line finishing oven 800. The in-line foil drier 400 and/or in-line finishing oven 800 heats the coated foil substrate 100 to dry and/or crosslink the electrodeposited coating film. As discussed above, the in-line foil drier 400 may be at a temperature and a length (i.e., application time) sufficient to increase the solids content (and reduce the moisture content) of the coating film to the ranges discussed above. For example, the temperature may be relatively low such that crosslinking does not occur, such as, for example, ambient temperature (about 23° C.) to about 50° C., although warmer temperatures could be used. Alternatively, if the in-line foil drier also constitutes the final drying and/or curing of the coating film, the time and temperature may be adjusted to be longer and/or warmer. For example, in order to fully dry and/or cure the coating film on the surface of the coated foil substrate 100, the coated foil substrate 100 may be baked at temperatures of 400° C. or lower, such as 50-400° C., such as 100-300° C., such as 150-280° C., such as 200-275° C., such as 225-270° C., such as 235-265° C., such as 240-260° C. The time of heating will depend somewhat on the temperature. Generally, higher temperatures require less time for drying and/or curing. Typically, final drying and/or curing times in these temperature ranges may be for at least 5 minutes, such as 5 to 60 minutes. The temperature and time should be sufficient such that the electrodepositable binder in the cured film is crosslinked (if applicable), that is, covalent bonds are formed between components of the electrodepositable coating composition 1000 present in the coating film. As discussed above, other methods of drying and/or curing of the coating film include microwave, infrared, e-beam and UV radiation.

Coated Foil Substrate

The present invention is also directed to a foil substrate 100 coated by the method of the present invention using the coating system 10 of the present invention. As used herein, the term "foil" refers to a relatively thin, flexible sheet of material.

The foil substrate may comprise any suitable conductive substrate. For example, suitable substrate materials include metal substrates, metal alloy substrates, and/or substrates that have been metallized, such as nickel-plated plastic. The metal or metal alloy may comprise cold rolled steel, hot rolled steel, steel coated with zinc metal, zinc compounds, or zinc alloys, such as electrogalvanized steel, hot-dipped galvanized steel, galvannealed steel, and steel plated with zinc alloy. Aluminum alloys of the 1XXX, 2XXX, 3XXX, 4XXX, 5XXX, 6XXX, 7XXX or 8XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. The substrate may be in the form of a current collector comprising a conductive material, and the conductive material may comprise a metal such as iron, copper, aluminum, nickel, and alloys thereof, as well as stainless steel. Additionally, substrate materials may comprise non-metal conductive materials including composite materials such as, for example, materials comprising carbon fibers or conductive carbon. Other suitable conductive substrates include a material coated with a conductive primer. The substrate may also comprise a carbon-coated conductive material, such as a carbon-coated foil.

The foil substrate 100 may have a thickness of about 1 to 500 microns, such as 5 to 100 microns, such as 7 to 25 microns.

The thickness of the coating film formed on the surface of the foil substrate 100 after electrodeposition may be from 1 to 1,000 microns (μm), such as 10 to 500 μm, such as 20 to 250 μm, such as 25 to 200 μm.

The present invention is also directed to an electrical storage device comprising the coated foil substrate of the present invention as an electrode therein. The electrical storage device comprises an electrode of the present invention, a counter electrode and an electrolyte. The electrode, counter-electrode or both may comprise the electrode of the present invention, as long as one electrode is a positive electrode and one electrode is a negative electrode. Electrical storage devices according to the present invention include a cell, a battery, a battery pack, a secondary battery, a capacitor, a pseudocapacitor, and a supercapacitor.

The electrical storage device includes an electrolytic solution and can be manufactured by using parts such as a separator in accordance with a commonly used method. As a more specific manufacturing method, a negative electrode and a positive electrode are assembled together with a separator there between, the resulting assembly is rolled or bent in accordance with the shape of a battery and put into a battery container, an electrolytic solution is injected into the battery container, and the battery container is sealed up. The shape of the battery may be like a coin, button or sheet, cylindrical, square or flat.

The electrolytic solution may be liquid or gel, and an electrolytic solution which can serve effectively as a battery may be selected from among known electrolytic solutions which are used in electrical storage devices in accordance with the types of a negative electrode active material and a positive electrode active material. The electrolytic solution may be a solution containing an electrolyte dissolved in a suitable solvent. The electrolyte may be conventionally known lithium salt for lithium ion secondary batteries. Examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiB(C_6H_5)_4$, $LiCF_3SO_3$, $LiCH_3SO_3$, $LiC_4F_9SO_3$, $Li(CF_3SO_2)_2N$, $LiB_4CH_3SO_3Li$ and $CF_3SO_3Li$. The solvent for dissolving the above electrolyte is not particularly limited and examples thereof include carbonate compounds such as propylene carbonate, ethylene carbonate, butylene carbonate, dimethyl carbonate, methyl ethyl carbonate and diethyl carbonate; lactone compounds such as γ-butyl lactone; ether compounds such as trimethoxymethane, 1,2-dimethoxyethane, diethyl ether, 2-ethoxyethane, tetrahydrofuran and 2-methyltetrahydrofuran; and sulfoxide compounds such as dimethyl sulfoxide. The concentration of the electrolyte in the electrolytic solution may be 0.5 to 3.0 mole/L, such as 0.7 to 2.0 mole/L.

During discharge of a lithium ion electrical storage device, lithium ions may be released from the negative electrode and carry the current to the positive electrode. This process may include the process known as deintercalation. During charging, the lithium ions migrate from the electrochemically active material in the positive electrode to the negative electrode where they become embedded in the electrochemically active material present in the negative electrode. This process may include the process known as intercalation.

As used herein, the term "polymer" refers broadly to oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, 2-ethylacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

As used herein molecular weights are determined by gel permeation chromatography using a polystyrene standard. Unless otherwise indicated molecular weights are on a weight average basis.

The term "glass transition temperature" is a theoretical value being the glass transition temperature as calculated by the method of Fox on the basis of monomer composition of the monomer charge according to T. G. Fox, Bull. Am. Phys. Soc. (Ser. II) 1, 123 (1956) and J. Brandrup, E. H. Immergut, Polymer Handbook $3^{rd}$ edition, John Wiley, New York, 1989.

As used herein, unless otherwise defined, the term substantially free means that the component is present, if at all, in an amount of less than 5% by weight, based on the total weight of the electrodepositable coating composition.

As used herein, unless otherwise defined, the term essentially free means that the component is present, if at all, in an amount of less than 1% by weight, based on the total weight of the electrodepositable coating composition.

As used herein, unless otherwise defined, the term completely free means that the component is not present in the electrodepositable coating composition, i.e., 0.00% by weight, based on the total weight of the electrodepositable coating composition.

As used herein, the term "total solids" refers to the non-volatile components of the electrodepositable coating composition of the present invention and specifically excludes the aqueous medium. The total solids explicitly include at least the binder solids, electrochemically active material, and, if present, the electrically conductive agent.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" internal roller, "a" counter-electrode, and "a" recirculating conduit, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

The following numbered aspects illustrate some aspects of the present invention, without being limited thereto:

1. A coating system for electrodepositing a battery electrode coating onto a foil substrate, the system comprising:
   a tank structured and arranged to hold an electrodepositable coating composition;
   a feed roller positioned outside of the tank structured and arranged to feed the foil into the tank;
   at least one counter electrode positioned inside the tank, the counter electrode in electrical communication with the foil during operation of the system to thereby deposit the battery electrode coating onto the foil; and
   an in-line foil drier positioned outside the tank structured and arranged to receive the coated foil from the tank.

2. The coating system of Aspect 1, wherein the in-line foil drier comprises an in-line source of thermal energy, an in-line source of radiation, an in-line gas flow means, or a combination thereof.

3. The coating system of Aspect 1 or 2, wherein the in-line foil drier comprises an in-line oven positioned outside of the tank structured and arranged to receive the coated foil directly from the tank, wherein the in-line oven may for example comprise an in-line thermal oven, an in-line microwave oven, an in-line infrared oven, an in-line UV oven, or a combination thereof.

4. The coating system according to any one of preceding Aspects 1 to 3, wherein the in-line foil drier comprises in-line gas flow means, and the gas flow from the in-line gas flow means comprises a nitrogen flow or an air flow.

5. The coating system according to any one of preceding Aspects 1 to 4, further comprising a rinsing system positioned outside the tank that provides a rinse of the foil substrate after exiting the tank and prior to entering the in-line foil drier.

6. The coating system according to any one of preceding Aspects 1 to 5, further comprising at least one internal roller positioned inside the tank, the internal roller structured and arranged to receive the foil substrate from the feed roller and direct the foil substrate past the counter electrode.

7. The coating system according to any one of preceding Aspects 1 to 6, wherein the in-line foil drier is positioned vertically above the tank or horizontally next to the tank.

8. The coating system according to any one of preceding Aspects 1 to 7, wherein the tank comprises a coated foil exit aperture and the coated foil substrate exits the tank through the coated foil exit aperture, the system optionally further comprising a foil substrate entry aperture with the foil substrate entering the tank through the foil substrate entry aperture.

9. The coating system according to Aspect 8, wherein the coated foil exit aperture is structured and arranged to be located below the fill level of the electrodepositable coating composition held by the tank.

10. The coating system according to any one of Aspect 8 or 9, further comprising a catch basin located below the tank structured and arranged to receive the electrodepositable coating composition exiting the tank through the coated foil exit aperture.

11. The coating system according to Aspect 10, further comprising a recirculating conduit for transferring the electrodepositable coating composition from the catch basin into the tank.

12. The coating system according to any one of preceding Aspects 1 to 11, further comprising compression rollers that press the coated foil substrate after it exits the in-line foil drier, the coating system optionally further comprising an in-line finishing oven that receives the pressed coated foil after it exits the compression rollers and/or further comprising at least one end roller positioned outside the tank for receiving the coated foil substrate, for example after it passes through the in-line finishing oven.

13. A method for electrocoating a foil substrate using the coating system according to any one of preceding Aspects 1 to 12, the method comprising:
 providing a foil substrate onto the feed roller;
 feeding the foil substrate into the tank past the counter electrode positioned inside the tank, wherein a surface of the foil substrate to be coated is submerged in the electrodepositable coating composition held in the tank;
 electrically coupling the counter electrode and the foil substrate to opposite poles of a power source;
 applying an electrical current from the power source to electrodeposit a coating from the electrodepositable coating composition onto the surface of the foil substrate; and then
 passing the coated foil substrate through the in-line foil drier to at least partially dry the coated foil substrate.

14. The method according to Aspect 13, wherein the method further comprises passing the foil substrate between compression rollers after the foil substrate is passed through the in-line foil drier, and compressing the coated foil substrate by the compression rollers after the foil substrate is at least partially dried in the in-line foil drier.

15. The method according to Aspect 14, wherein the method further comprises passing the foil through an in-line finishing oven after the foil substrate is passed through the compression rollers, and heating the coated foil substrate in the in-line finishing oven after the foil substrate is compressed by the compression rollers.

16. The method according to any one of preceding Aspects 13 to 15, wherein the foil substrate is continuously fed through the coating system.

17. A foil substrate coated by the method according to any one of preceding Aspects 13 to 16.

18. An electrical storage device comprising:
 (a) an electrode comprising the coated foil substrate according to Aspect 17;
 (b) a counter-electrode, and
 (c) an electrolyte.

19. The electrical storage device of Aspect 18, wherein the electrical storage device comprises a cell.

20. The electrical storage device of Aspect 18, wherein the electrical storage device comprises a battery pack.

21. The electrical storage device of Aspect 18, wherein the electrical storage device comprises a secondary battery.

22. The electrical storage device of Aspect 18, wherein the electrical storage device comprises a capacitor.

23. The electrical storage device of Aspect 18, wherein the electrical storage device comprises a supercapacitor.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:
1. A coating system for electrodepositing a battery electrode coating onto a foil substrate, the system comprising:
 a tank structured and arranged to hold an electrodepositable coating composition;
 a feed roller positioned outside of the tank structured and arranged to feed the foil substrate into the tank;
 at least one counter electrode positioned inside the tank, the counter electrode in electrical communication with the foil substrate during operation of the system to thereby deposit the battery electrode coating onto the foil substrate; and
 an in-line foil drier positioned outside the tank structured and arranged to receive the coated foil substrate from the tank;
 wherein the coating system is free of rollers located after the counter-electrode and before the in-line foil drier.

2. The coating system of claim 1, wherein the in-line foil drier comprises an in-line source of thermal energy, an in-line source of radiation, an in-line gas flow means, or a combination thereof.

3. The coating system of claim 1, wherein the in-line foil drier comprises an in-line oven positioned outside of the tank structured and arranged to receive the coated foil substrate from the tank.

4. The coating system of claim 3, wherein the in-line oven comprises an in-line thermal oven, an in-line microwave oven, an in-line infrared oven, an in-line UV oven, or a combination thereof.

5. The coating system of claim 1, wherein the in-line foil drier comprises an in-line gas flow means, and the gas flow from the in-line gas flow means comprises a nitrogen flow or an air flow.

6. The coating system of claim 1, further comprising a rinsing system positioned outside the tank that provides a rinse of the foil substrate after exiting the tank and prior to entering the in-line foil drier.

7. The coating system of claim 1, further comprising at least one internal roller positioned inside the tank, the internal roller structured and arranged to receive the foil substrate from the feed roller and direct the foil substrate past the counter electrode.

8. The coating system of claim 1, wherein the in-line foil drier is positioned vertically above the tank.

9. The coating system of claim 1, wherein the tank comprises a coated foil exit aperture and the coated foil substrate exits the tank through the coated foil exit aperture.

10. The coating system of claim 9, wherein the coated foil exit aperture is structured and arranged to be located below the fill level of the electrodepositable coating composition held by the tank.

11. The coating system of claim 9, further comprising a catch basin located below the tank structured and arranged to receive the electrodepositable coating composition exiting the tank through the coated foil exit aperture.

12. The coating system of claim 11, further comprising a recirculating conduit for transferring the electrodepositable coating composition from the catch basin into the tank.

13. The coating system of claim 9, further comprising a foil substrate entry aperture and the foil substrate enters the tank through the foil substrate entry aperture.

14. The coating system of claim 9, wherein the in-line foil drier is positioned horizontally next to the tank.

15. The coating system of claim 1, further comprising compression rollers that press the coated foil substrate after it exits the in-line foil drier.

16. The coating system of claim 15, further comprising an in-line finishing oven that receives the pressed coated foil substrate after it exits the compression rollers.

17. The coating system of claim 16, further comprising at least one end roller positioned outside the tank for receiving the coated foil substrate after it passes through the in-line finishing oven.

18. A method for electrocoating a foil substrate using the coating system according to claim 1, the method comprising:
    providing a foil substrate onto the feed roller;
    feeding the foil substrate into the tank past the counter electrode positioned inside the tank, wherein a surface of the foil substrate to be coated is submerged in the electrodepositable coating composition held in the tank;
    electrically coupling the counter electrode and the foil substrate to opposite poles of a power source;
    applying an electrical current from the power source to electrodeposit a coating from the electrodepositable coating composition onto the surface of the foil substrate; and then
    passing the coated foil substrate through the in-line foil drier to at least partially dry the coated foil substrate.

19. The method of claim 18, wherein the method further comprises passing the foil substrate between compression rollers after the foil substrate is passed through the in-line foil drier, and compressing the coated foil substrate by the compression rollers after the foil substrate is at least partially dried in the in-line foil drier.

20. The method of claim 19, wherein the method further comprises passing the foil substrate through an in-line finishing oven after the foil substrate is passed through the compression rollers, and heating the coated foil substrate in the in-line finishing oven after the foil substrate is compressed by the compression rollers.

21. The method of claim 18, wherein the foil substrate is continuously fed through the coating system.

22. A foil substrate coated by the method according to claim 18.

23. An electrical storage device comprising:
    (a) an electrode comprising the coated foil substrate of claim 22;
    (b) a counter-electrode, and
    (c) an electrolyte.

24. The electrical storage device of claim 23, wherein the electrical storage device comprises a cell.

25. The electrical storage device of claim 23, wherein the electrical storage device comprises a battery pack.

26. The electrical storage device of claim 23, wherein the electrical storage device comprises a secondary battery.

27. The electrical storage device of claim 23, wherein the electrical storage device comprises a capacitor.

28. The electrical storage device of claim 23, wherein the electrical storage device comprises a supercapacitor.

* * * * *